United States Patent
Pever et al.

(10) Patent No.: US 11,824,336 B2
(45) Date of Patent: Nov. 21, 2023

(54) OUTDOOR BUSWAY SYSTEM HAVING PROTECTED CONDUCTOR SECTIONS

(71) Applicant: Siemens Industry, Inc., Alpharetta, GA (US)

(72) Inventors: Steven E. Pever, Simpsonville, SC (US); Timothy J. Fink, Woodruff, SC (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 91 days.

(21) Appl. No.: 17/451,674

(22) Filed: Oct. 21, 2021

(65) Prior Publication Data

US 2023/0125946 A1    Apr. 27, 2023

(51) Int. Cl.
*H02G 3/04*    (2006.01)
*H02G 3/08*    (2006.01)

(52) U.S. Cl.
CPC .......... *H02G 3/0456* (2013.01); *H02G 3/081* (2013.01)

(58) Field of Classification Search
CPC ............................. H02G 3/0456; H02G 3/081
USPC ....................................................... 174/70 R
See application file for complete search history.

(56) References Cited

U.S. PATENT DOCUMENTS

| | | | | | |
|---|---|---|---|---|---|
| 2,356,006 | A | * | 8/1944 | Samer | H02G 5/06 174/99 B |
| 3,088,994 | A | * | 5/1963 | Cataldo | H02G 5/06 439/213 |
| 3,346,687 | A | * | 10/1967 | Giger, Jr. | H02G 5/06 174/68.2 |
| 3,360,602 | A | * | 12/1967 | Harton | H02G 5/06 174/68.2 |
| 3,401,230 | A | * | 9/1968 | Giger, Jr. | H02G 5/06 174/99 B |
| 3,439,309 | A | * | 4/1969 | Giger, Jr. | H02G 5/08 174/68.2 |
| 3,555,293 | A | * | 1/1971 | Shannon | H02G 5/007 174/88 B |
| 3,584,138 | A | * | 6/1971 | Pritzen, Jr. | H02G 5/06 174/68.3 |
| 3,636,237 | A | * | 1/1972 | Hafer | H02G 5/06 174/88 B |
| 3,732,353 | A | * | 5/1973 | Koenig | H02G 5/06 174/68.2 |
| 4,804,804 | A | * | 2/1989 | Hibbert | H02G 5/10 174/68.2 |
| 4,820,177 | A | * | 4/1989 | Slicer | H02G 5/007 439/207 |
| 4,886,468 | A | * | 12/1989 | Harton | H02G 5/08 174/68.2 |

(Continued)

*Primary Examiner* — Timothy J Thompson
*Assistant Examiner* — Michael F McAllister

(57) ABSTRACT

An outdoor busway system includes one or more conductor sections and one or more electrical connectors such that a conductor section of the outdoor busway system comprises a housing assembly and a conductor set. The housing assembly includes an upper housing section and a lower housing section such that the upper housing section and the lower housing section each having opposing counterposed features to oppose a first separation force of the housing assembly. The conductor set includes a plurality of viscoelastic structural sheets stacked alternatively between a plurality of conductor bars to oppose a second separation force between conductor bars of the plurality of conductor bars.

19 Claims, 16 Drawing Sheets

(56) References Cited

U.S. PATENT DOCUMENTS

| | | | | |
|---|---|---|---|---|
| 4,979,906 A * | 12/1990 | Shrout | ............... | H02G 5/007 174/88 B |
| 5,401,906 A * | 3/1995 | Bryant | ............... | H02G 5/007 174/70 B |
| 5,614,697 A * | 3/1997 | Jego | ............... | H02G 3/0608 174/91 |
| 5,619,014 A * | 4/1997 | Faulkner | ............... | H02G 5/007 174/68.2 |
| 5,760,339 A * | 6/1998 | Faulkner | ............... | H02G 5/007 174/88 B |
| 5,785,542 A * | 7/1998 | Johnson | ............... | H02G 5/007 439/213 |
| 6,180,885 B1 * | 1/2001 | Goldman | ............... | H02G 5/06 174/68.2 |
| 6,329,598 B1 * | 12/2001 | M'Sadoques | ............... | H02G 5/007 174/68.2 |
| 6,435,888 B1 * | 8/2002 | Reed, Jr. | ............... | H01R 4/30 174/88 B |
| 7,199,165 B2 * | 4/2007 | Kassa | ............... | C08J 9/103 521/142 |
| 8,163,998 B2 * | 4/2012 | Bhathija | ............... | H01R 25/145 174/68.2 |
| 8,550,830 B1 * | 10/2013 | Bhathija | ............... | H01R 31/02 439/213 |
| 9,190,791 B1 * | 11/2015 | Jaena | ............... | H01R 25/145 |
| 9,281,674 B2 * | 3/2016 | Walgenbach | ............... | H02G 5/06 |
| 9,705,300 B1 * | 7/2017 | Maurer | ............... | H02G 5/007 |
| 2004/0266898 A1 * | 12/2004 | Kassa | ............... | C08J 9/103 521/134 |
| 2009/0145625 A1 * | 6/2009 | Bhathija | ............... | H02G 5/06 174/68.2 |
| 2013/0170149 A1 * | 7/2013 | Reese | ............... | H02S 40/36 361/728 |
| 2013/0171850 A1 * | 7/2013 | Mooney | ............... | H02G 5/007 439/213 |
| 2014/0116617 A1 * | 5/2014 | Walgenbach | ............... | H02G 5/06 156/295 |
| 2014/0141636 A1 * | 5/2014 | O'Leary | ............... | H01R 25/162 439/213 |
| 2015/0344138 A1 * | 12/2015 | Wen | ............... | B64C 1/12 219/544 |
| 2016/0104986 A1 * | 4/2016 | Sheridan | ............... | H01R 25/162 439/213 |
| 2017/0170616 A1 * | 6/2017 | Wynnik | ............... | H01R 25/145 |
| 2019/0020159 A1 * | 1/2019 | Wynnik | ............... | H02G 5/007 |
| 2019/0103717 A1 * | 4/2019 | Pever | ............... | H02G 5/007 |
| 2020/0036145 A1 * | 1/2020 | Wynnik | ............... | H01R 25/162 |

* cited by examiner

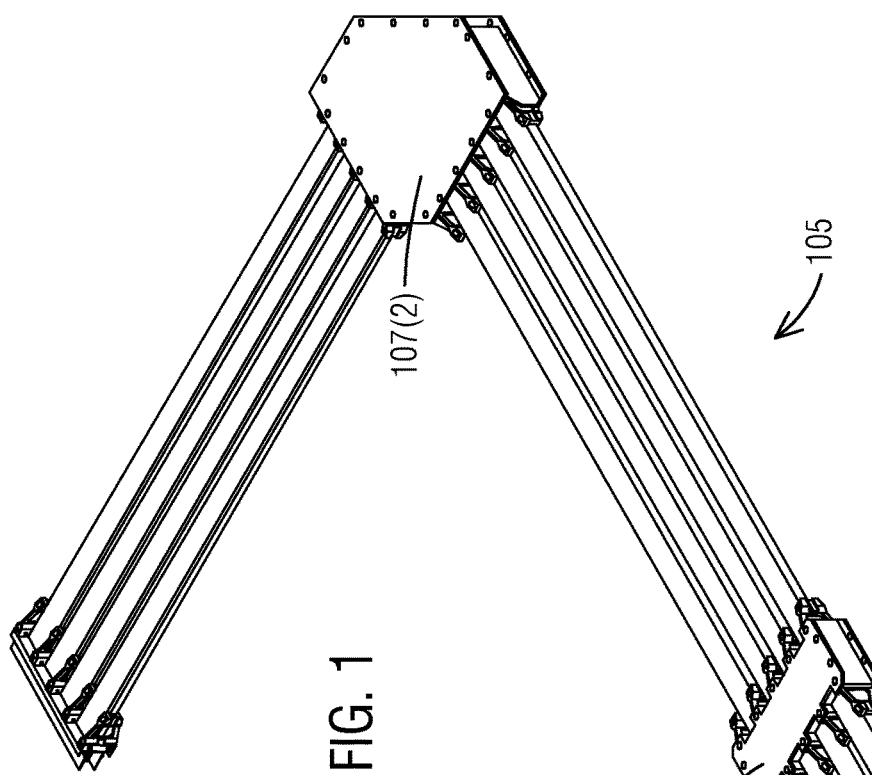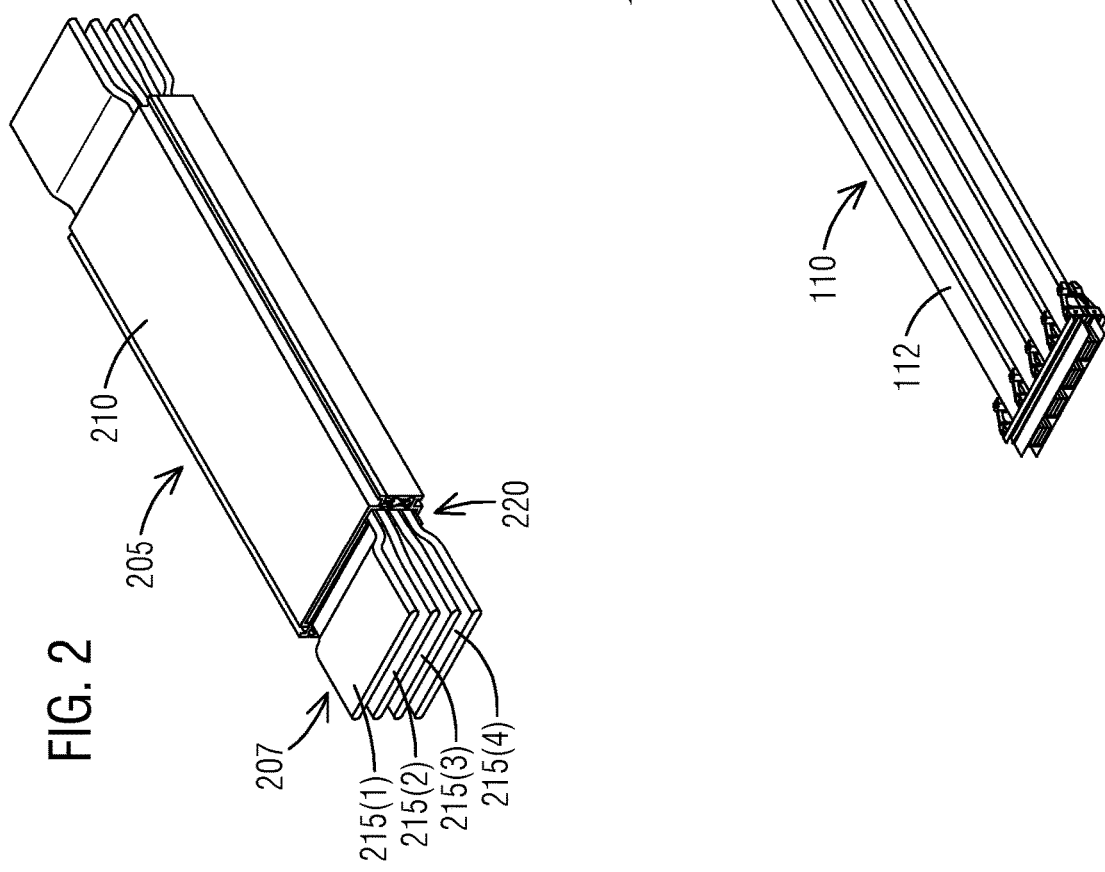

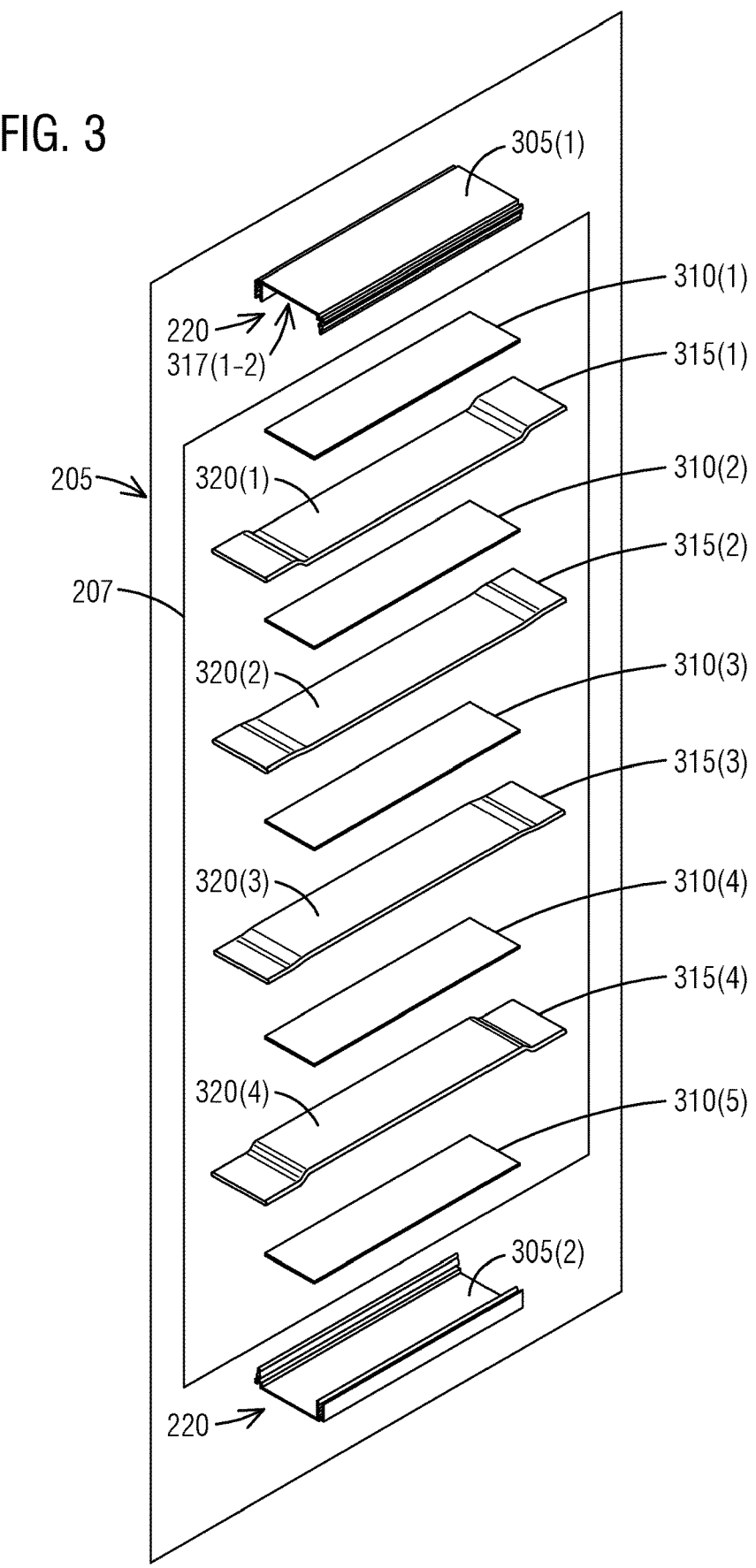

2000

2100

2200

OUTDOOR BUSWAY SYSTEM HAVING PROTECTED CONDUCTOR SECTIONS

BACKGROUND

1. Field

Aspects of the present invention generally relate to an outdoor busway system having conductor sections that are protected when exposed to environments posing risk of ingress.

2. Description of the Related Art

Busway systems are commonly provided where power distribution is required. Frequently the environment is out of doors or otherwise presenting risk of contaminant ingress. Typical systems offer various means for sealing openings of an enclosure at overlaps, at panels, joints and bolted connections where ingress of contaminants might occur. These sealing means are generally suitable and accepted in the industry. However, when these sealing systems fail contaminant ingress can be introduced into spaces containing live electrical components. Of special concern is busway constructions having sets of insulated conductors each of opposite polarity and retained in proximity within an enclosure. Retaining these conductors has typically depended on one or more external treatments including multi piece enclosure system having a combination of seals and fastening devices. Additional materials may be wrapped around a conductor set to provide added strength. These external treatments while effective under normal conditions can fail when exposed to environments posing risk of ingress. Furthermore, when contaminant ingress occurs the systems for retaining conductor bars also retains contaminants in contact with conductors. In this case a conductor's insulation may be compromised causing an electrical short circuit. Additionally, capillary action frequently causes water and waterborne electrolytes to travel within the system further compromising the electrical integrity of the system.

Prior art in UL marketspace (including Siemens Sentron Busway) employs sealing systems applied external to the bar pack. Systems include any combination of covers, shields, elastomeric gaskets and seals, rubber plugs, curable caulking and potted barriers. Typically, these solutions are applied to housings, joints, covers, openings, between enclosure overlaps and around electrical passthroughs.

Prior art in EU Marketspace employs sealing systems similar to those found in UL products except in systems where bar packs are completely encased in resin. EU electrical standards differ from UL in that protective metal housings are not required for resin encased busway systems. Resin encased systems typically require users to permanently field seal each joint connection in resin during installation.

Sentron busway and its competitors utilize a "sandwich" construction where insulated conductors of opposite polarity are stacked successively and restrained in contact with one another in the form of a bar pack. Bar packs are traditionally restrained and protected by any combination of insulating barriers, wraps of fiberglass filament tape, external housing constructions and bolted supports. Sandwich style busways including Sentron have been largely adapted for use in outdoor applications. Historically Sentron and presumably any sandwich busway system could experience failure of sealing systems allowing water and contaminants to enter the busways housing and ultimately the bar pack. Ingress into the bar pack occurs when water travels by capillary action along the small gaps between bars of the bar pack or housing. Ingress is considered irreversible often going undetected. Water and contaminants in these small spaces do not naturally dissipate and cannot be easily removed. Ingress can reduce electrical insulation resistance causing a breakdown in the products dielectric withstand rating. Known factors of insulation breakdown include electrolytic value of contaminants, absorption of contaminants into the filaments of the fiberglass tapes and growths of organic substances. Unchecked breakdowns can result in electrical failure. Remediation to date has been replacement of effected busway sections.

Water and contaminant ingress causes insulation resistance to breakdown: a. specifically between bus bars of sandwich type busway constructions, b. specifically in the filaments of fiberglass tapes and c. specifically at housing penetrations adjacent to the bar pack.

Therefore, there is a need for a better busway system for an outdoor application.

SUMMARY

Briefly described, aspects of the present invention relate to an outdoor busway system having conductor sections. A busway system is provided for supplying and distributing electrical power in environments where ingress of electrolytic contaminants may be of a particular risk. This described system has certain similarity with systems described as "sandwich" busway where insulated conductors of opposite polarity are layered flatwise and retained in intimate contact within an enclosure system. The construction of this busway system is unique having express application and treatment of its conductor section. A conductor section has an enclosure system being sealed and joined with a conductor set and having viscoelastic structural adhesive sheets adhered between each current carrying component. This construction is determined as a system having express ability to prevent capillary ingress of electrolytic contaminants between current carrying components while providing mechanical and electrical properties essential to stable performance of electrical busway systems. The enclosure of a conductor section is having two housing halves (each half having opposing counterposed features to oppose a first separation force of a housing assembly) of common design that are expressly void of through penetrations and determined to irreversibly interlock about a conductor set thus forming a protective enclosure free of through penetrations or threaded fasteners. The enclosure of this conductor section is further elastically adhered with a conductor set having flatwise oriented conductors each being interleaved on their flat sides and adhered with viscoelastic structural sheets to form a permanently joined and sealed conductor section to oppose a second separation force between conductor bars of a plurality of conductor bars. Conductor sections of this system provide five independent electrical circuits each having an electrical capacity as determined by the material of its conductors and its express sectional area and where the housing is determined as earth potential ground. A conductor section may further be engaged at its edges and along its length with an interlocking extrusion determined to increase the sections short circuit and bend strength characteristics and to further prevent collection of electrolytic liquids. Additionally, either end of a conductor section may be provided with a clamp set or end assembly determined to join with the walls of an electrical connectors housing and having mechanical and electrical capability to join multiple conductor sections at their sides where a busway system of any length and having a total electrical capacity equivalent to the number of conductor sections being joined may be electively determined. While its understood conductors in proximity normally operate with lower voltage drop and lower electromagnetic separation forces during an electrical short circuit, a clear advantage would involve a system where conductors could be retained in proximity where retention force was provided internal to the conductor set. This invention seeks to retain the conductor set internally while managing mechanical, electrical, thermal integrity of a normally operating busway system and the extreme separation forces common when a system experiences an electrical short circuit.

In accordance with one illustrative embodiment of the present invention, an outdoor busway system is provided having one or more conductor sections and one or more electrical connectors. A conductor section of the outdoor busway system comprises a housing assembly including an upper housing section and a lower housing section such that the upper housing section and the lower housing section each having opposing counterposed features to oppose a first separation force of the housing assembly. The conductor section of the outdoor busway system further comprises a conductor set including a plurality of viscoelastic structural sheets stacked alternatively between a plurality of conductor bars to oppose a second separation force between conductor bars of the plurality of conductor bars.

In accordance with one illustrative embodiment of the present invention, a method of protecting an outdoor busway system having one or more conductor sections and one or more electrical connectors. The method comprises providing a conductor section of the busway system by: providing a housing assembly including an upper housing section and a lower housing section such that the upper housing section and the lower housing section each having opposing counterposed features to oppose a first separation force of the housing assembly and providing a conductor set including a plurality of viscoelastic structural sheets stacked alternatively between a plurality of conductor bars to oppose a second separation force between conductor bars of the plurality of conductor bars.

BRIEF DESCRIPTION OF THE DRAWINGS

FIG. 1 illustrates an outdoor busway system with electrical connectors in accordance with an exemplary embodiment of the present invention.

FIG. 2 illustrates an isometric view of a conductor section in accordance with an exemplary embodiment of the present invention.

FIG. 3 illustrates a conductor section with a conductor set, an upper housing section and a lower housing section in accordance with an exemplary embodiment of the present invention.

DETAILED DESCRIPTION

Figure 4:
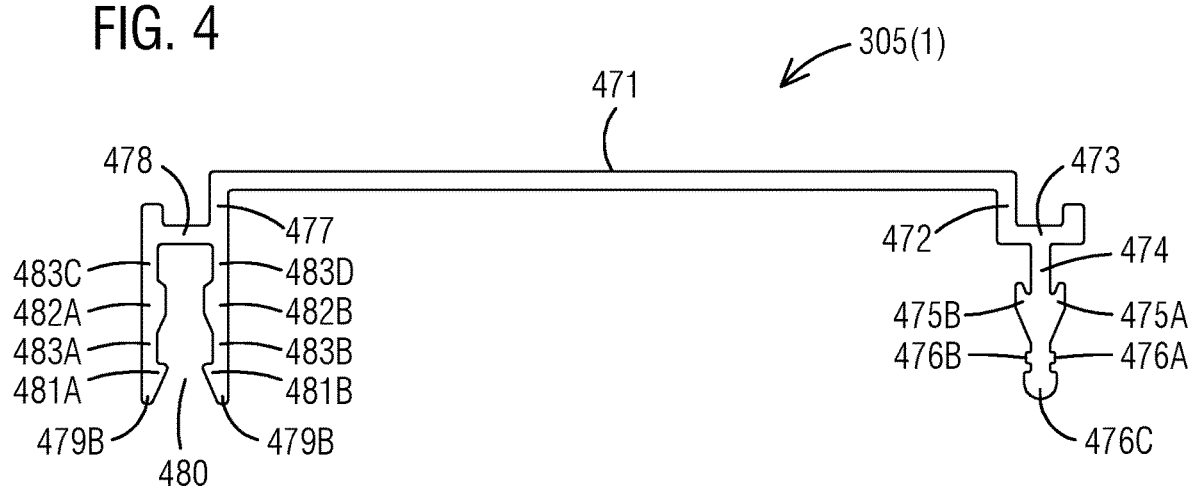
FIG. 4 illustrates a cross sectional view of an upper housing section in accordance with an exemplary embodiment of the present invention.

To facilitate an understanding of embodiments, principles, and features of the present invention, they are explained hereinafter with reference to implementation in illustrative embodiments. In particular, they are described in the context of an outdoor busway system having conductor sections for environments where ingress of electrolytic contaminants may be of a particular risk. The enclosure of a conductor section is having two housing halves (each half having opposing counterposed features to oppose a first separation force of a housing assembly) of common design that are expressly void of through penetrations and determined to irreversibly interlock about a conductor set thus forming a protective enclosure free of through penetrations or threaded fasteners. The enclosure of this conductor section is further elastically adhered with a conductor set having flatwise oriented conductors each being interleaved on their flat sides and adhered with viscoelastic structural sheets to form a permanently joined and sealed conductor section to oppose a second separation force between conductor bars of a plurality of conductor bars. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the outdoor busway system according to the present disclosure are described below with reference to FIGS. 1-35 herein. Like reference numerals used in the drawings identify similar or identical elements throughout the several views. The drawings are not necessarily drawn to scale.

Consistent with one embodiment of the present invention, FIG. 1 represents an outdoor busway system 105 with electrical connectors 107(1-2) for environments where ingress of electrolytic contaminants may be of a particular risk in accordance with an exemplary embodiment of the present invention. The outdoor busway system 105 is provided for supplying and distributing electrical power. The outdoor busway system 105 has certain similarity with systems described as "sandwich" busway where insulated conductors of opposite polarity are layered flatwise and retained in intimate contact within an enclosure system. The construction of the outdoor busway system 105 is unique having express application and treatment of its conductor section. A conductor section 110 has an enclosure 112 being sealed and joined with a conductor set (not seen) and having viscoelastic structural adhesive sheets (not seen) adhered between each current carrying component. The conductor set has ends to receive an electrical connector of the one or more electrical connectors 107(1-2).

The outdoor busway system 105 is configured as a system having express ability to prevent capillary ingress of electrolytic contaminants between current carrying components while providing mechanical and electrical properties essential to stable performance of electrical busway systems. The enclosure 112 of the conductor section 110 is having two housing halves (not seen, each half having opposing counterposed features to oppose a first separation force of the enclosure 112 or a housing assembly) of common design that are expressly void of through penetrations and determined to irreversibly interlock about the conductor set thus forming a protective enclosure free of through penetrations or threaded fasteners. The enclosure 112 of the conductor section 110 is further elastically adhered with the conductor set having flatwise oriented conductors each being interleaved on their flat sides and adhered with the viscoelastic structural sheets to form a permanently joined and sealed conductor section to oppose a second separation force between conductor bars of a plurality of conductor bars.

Conductor sections of the outdoor busway system 105 provide five independent electrical circuits each having an electrical capacity as determined by the material of its conductors and its express sectional area and where the housing assembly is determined as earth potential ground. The conductor section 110 may further be engaged at its edges and along its length with an interlocking extrusion determined to increase the sections short circuit and bend strength characteristics and to further prevent collection of electrolytic liquids.

Additionally, either end of the conductor section 110 may be provided with a clamp set or an end assembly determined to join with the walls of an electrical connectors housing and having mechanical and electrical capability to join multiple conductor sections at their sides where a busway system of any length and having a total electrical capacity equivalent to the number of conductor sections being joined may be electively determined. While its understood conductors in proximity normally operate with lower voltage drop and lower electromagnetic separation forces during an electrical short circuit, a clear advantage would involve a system where conductors could be retained in proximity where retention force was provided internal to the conductor set. This invention seeks to retain the conductor set internally while managing mechanical, electrical, thermal integrity of a normally operating busway system and the extreme separation forces common when a system experiences an electrical short circuit.

Referring to FIG. 2, it illustrates an isometric view of a conductor section 205 in accordance with an exemplary embodiment of the present invention. The conductor section 205 is comprised of a conductor set 207 where a housing assembly 210 having been assembled becomes adhesively adhered with the conductor set 207 where the geometric center planes of each are aligned and having self-curing sealant applied at either end of the housing assembly 210 about the perimeter of conductor set 207 and between the inner walls of the housing assembly 210. The conductor section 205 forms five essential electrical paths of an outdoor busway system where the housing assembly 210 provides a conductive path to earth potential ground and where conductors 215(1-4) form an electrical path for system currents. The housing assembly 210 has counterposed features 220 which lock and seal opposing separation forces and forming a strong external encasement sealed from the environment.

Turning now to FIG. 3, it illustrates the conductor section 205 with the conductor set 207, an upper housing section 305(1) and a lower housing section 305(2) in accordance with an exemplary embodiment of the present invention. The outdoor busway system 105 may have one or more conductor sections and one or more electrical connectors such that the conductor section 205 of the outdoor busway system 105 comprises the housing assembly 210 including the upper housing section 305(1) and the lower housing section 305(2) such that the upper housing section 305(1) and the lower housing section 305(2) each having the opposing counterposed features 220 (see 481A, 481B, 475A, 475B in FIG. 4) to oppose a first separation force of the housing assembly 210. The first separation force is any mechanical force occurring in the course of normal use (i.e., handling, installation, thermal expansion/contraction, etc.).

The conductor section 205 of the outdoor busway system 105 comprises the conductor set 207 including a plurality of viscoelastic structural sheets 310(1-5) stacked alternatively between a plurality of conductor bars 315(1-4) to oppose a second separation force between conductor bars of the plurality of conductor bars 315(1-4). The second separation force is any electromagnetic force occurring in the course of an electrical event (normal or abnormal). Of specific concern are extreme electromagnetic separation forces present during an electrical short circuit event. Electrically speaking, electromagnetic forces are present during electrical operation of busways (normal condition). A short circuit (abnormal event) causes high fault currents that induce extremely high electromagnetic forces between conductors of opposite polarity. Unless restrained conductors and housings separate instantaneously.

Structural adhesive sheets 310(1) and 310(5) form molecular attraction force with walls 317(1-2) of the upper housing section 305(1) and the lower housing section 305(2) of the housing assembly 210 and with insulation 320(1-4) of the conductor bars 315(1) and 315(4). Structural adhesive sheets 310(2-4) form molecular attraction force with insulation 320(1-4) of conductor bars 315(1-4). The housing assembly 210 combined with the structural adhesive sheets 310(1-5) to form a viscoelastic system having the essential characteristics necessary to maintain the mechanical and electrical integrity of the conductor section 205.

The opposing counterposed features 220 are configured to prevent separation of the upper housing section 305(1) from the lower housing section 305(2). The opposing counterposed features 220 are assembled together so as to open in a destructive manner.

The housing assembly 210 has an ability to interlock the upper housing section 305(1) with the lower housing section 305(2) thus forming an enclosed surround. The housing assembly 210 is void of thru holes and void of threaded fasteners.

A viscoelastic structural sheet of the plurality of viscoelastic structural sheets 310(1-5) is a structural adhesive sheet being a viscoelastic polymer sheet having a thickness of 0.045 inches, a width of 3.75 inches, a length proportional with a conductor bar of the plurality of conductor bars 315(1-4) and having an adhesive laminated on two sides and disposed perpendicular to the thickness. Each conductor bar's of the plurality of conductor bars 315(1-4) largest flat area is joined contiguously. The plurality of conductor bars 315(1-4) is configured to move elastically without separation. The plurality of viscoelastic structural sheets 310(1-5) is configured to prevent liquid ingress between conductor bars of the plurality of conductor bars 315(1-4), absorb an instantaneous force's loads, and electrically insulate between conductor bars of the plurality of conductor bars 315(1-4).

FIG. 4 illustrates a cross sectional view of the upper housing section 305(1) in accordance with an exemplary embodiment of the present invention. The upper housing section 305(1) is made of metal and may have a protective coating of paint, electroplates of zinc, nickel and alloys of metal, or an anodized oxide of any color. The upper housing section's 305(1) structure includes a flat first wall 471 approximately 0.100 inches thick, four inches in width and of a length suitable with a systems specification. A second wall structure 472 is adjoined perpendicular to the first wall 471 along its length. The second wall structure 472 is offset from the first wall 471, forming a first square shaped channel 473 and bearing a perpendicular wall 474 having opposed inclined feature 475A, 475B and rib 476A and 476B on its sides and having a full round 476C at its end. A third wall structure 477 is adjoined perpendicular to the first wall 471 along its length opposite the second wall structure 472. The third wall structure 477 is offset from the first wall 471, forming a second square shaped channel 478 bearing two opposed walls 479A and 479B forming an opposed channel 480 having incline features 481A, 481B, 482A, 482B and grooves 483A, 483B, 483C and 483D along each inner surface.

Figure 5:
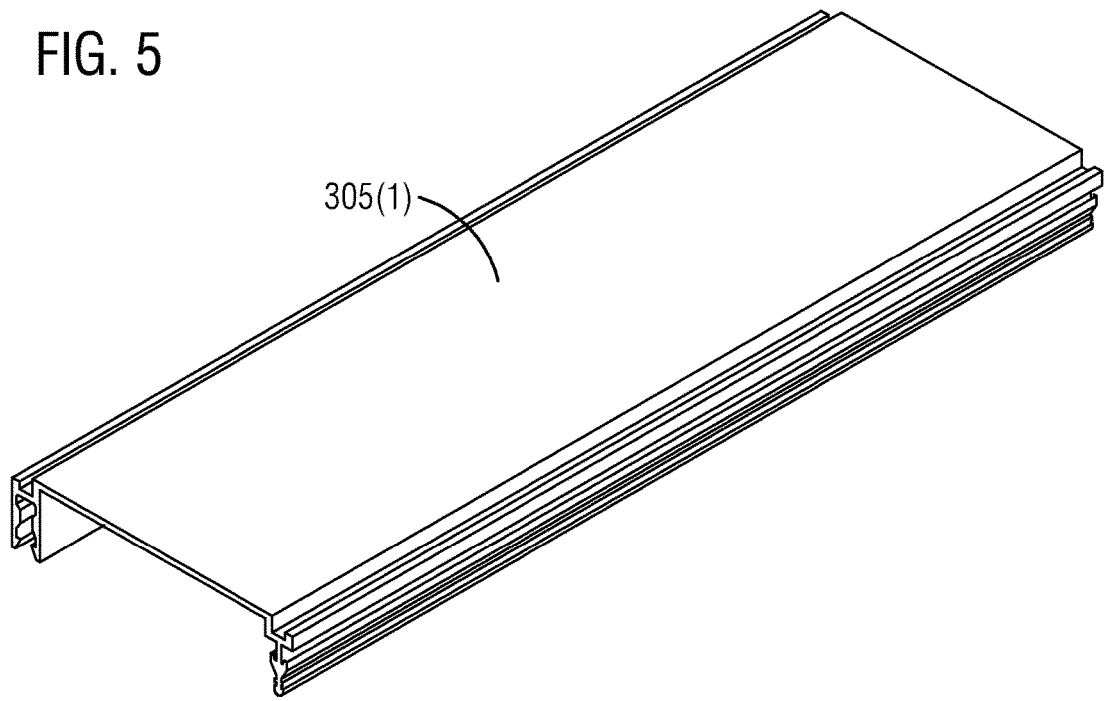
FIG. 5 illustrates an isometric view of an upper housing section in accordance with an exemplary embodiment of the present invention.

As seen in FIG. 5, it illustrates an isometric view of the upper housing section 305(1) in accordance with an exemplary embodiment of the present invention. The upper housing section's 305(1) and the lower housing section's 305(2) extruded metallic substrate having a cross sectional area of inverse proportion with the metals electrical continuity and suited with the systems electrical rating is determined as an earth potential conductor. Described features of the upper housing section 305(1) with the lower housing section 305(2) are determined to join two housings mechanically and irreversibly along their length without aid of fasteners.

Figure 6:
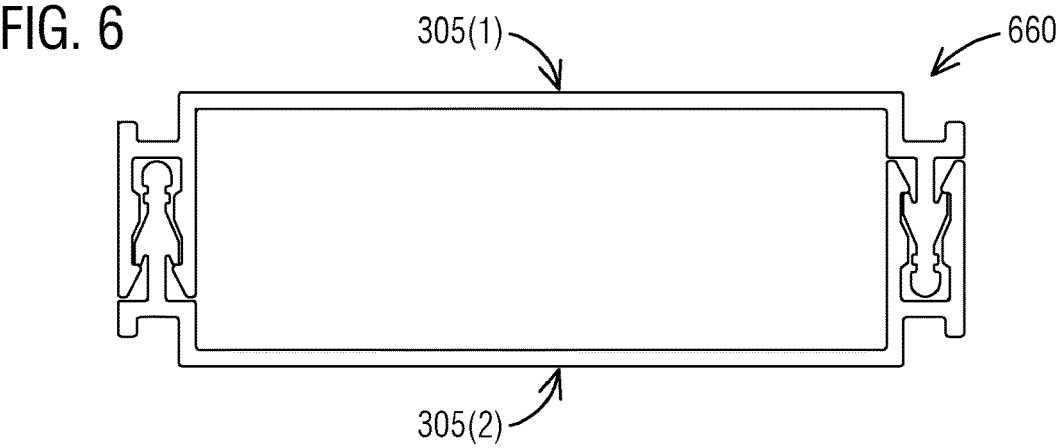
FIG. 6 illustrates a housing assembly in a cross-section view with an upper housing section and a lower housing section in accordance with an exemplary embodiment of the present invention.
Figure 7:
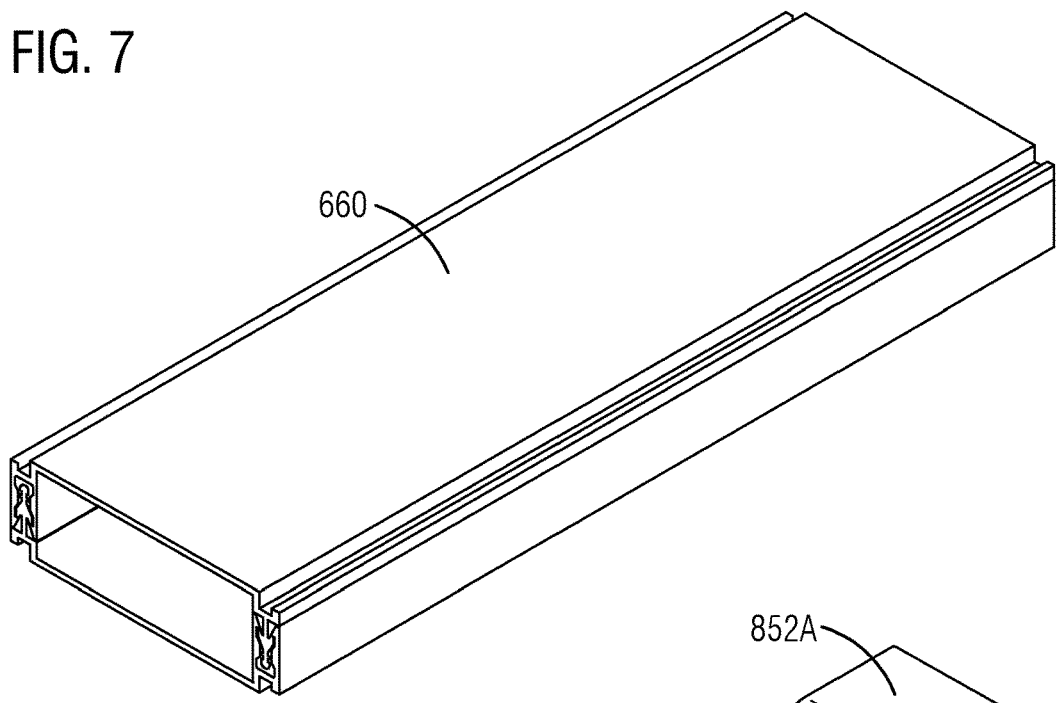
FIG. 7 illustrates an isometric view of a housing assembly in accordance with an exemplary embodiment of the present invention.

As shown in FIG. 6, it illustrates a housing assembly 660 in a cross-section view with the upper housing section 305(1) and the lower housing section 305(2) in accordance with an exemplary embodiment of the present invention. In FIG. 7, it illustrates an isometric view of the housing assembly 660 in accordance with an exemplary embodiment of the present invention.

Referring to FIG. 4 and FIG. 6, a first housing (e.g., the upper housing section 305(1)) may be assembled with a second housing (e.g., the lower housing section 305(2)) to form the housing assembly 660 which is determined to meet certain mechanical and electrical requirements of the system 105. The housing assembly 660 is accomplished by inserting the wall 474 of the upper housing section 305(1) into the channel 480 of the lower housing section 305(2) while simultaneously inserting the wall 474 of the lower housing section 305(2) into the channel 480 of the upper housing section 305(1). Equal and opposed force applied normal to the wall 471 of each the upper housing section 305(1) and the lower housing section 305(2) and perpendicular to the housings length causes inclined feature pairs 475A and 475B of the wall 474 to slidably engage inclined feature pairs 481A and 481B of the channel 80 where the walls 479A and 479B displace elastically in equal and opposite directions until inclined feature pairs 475A and 475B pass inclined feature pairs 481A and 481B where the walls 479A and 479B of the channel 480 elastically resume their original position causing inclined feature pairs 475A, 475B and 481A, 481B to become counterposed. In their counterposed positions inclined feature pairs 475A, 475B and 481A, 481B are determined to prevent separation of the upper housing section 305(1) and the lower housing section 305(2). Square shaped ribs 476A, 476B of the wall 474, inclined features 482A, 482B and grooves 483A, 483B, 483C and 483D of the walls 479A and 479B are determined to increase surface area of the walls 474, 479A and 479B where sealant can occupy void areas about the wall 474 and between the walls 479A and 479B of the channel 480. The housing assembly 660 is determined void of penetrations and having sealed walls where its interior is protected from the environment.

Figure 8:
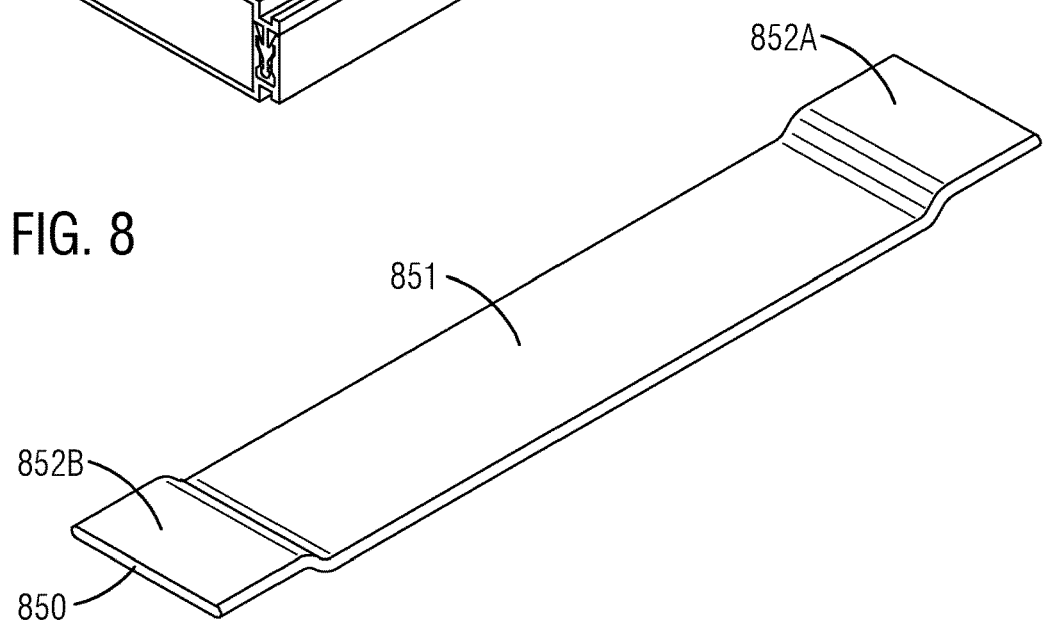
FIG. 8 illustrates a conductor bar in accordance with an exemplary embodiment of the present invention.

With regard to FIG. 8, it illustrates a conductor bar 850 in accordance with an exemplary embodiment of the present invention. The conductor bar 850 is a metal bar comprised of a selected nonferrous material and having electrical properties suitable with a systems electrical specification. The conductor bar 850 has a first flat wall 851 having full round edges along its length and having a thickness one fourth inches, a width of four inches and of any length suitable for a systems specification. Either end of the wall 851 may be provided with equally disposed walls 852A and 852B being of any length and planar to the wall 851. End surfaces of the bar 850 are perpendicular to its length and thickness. The conductor bar 850 may be plated, coated, or wrapped with any combination of tin, copper, silver, or rigid insulation. The walls 852A and 852B may have certain electrical contact areas where insulation is removed.

Figures 9, 10:
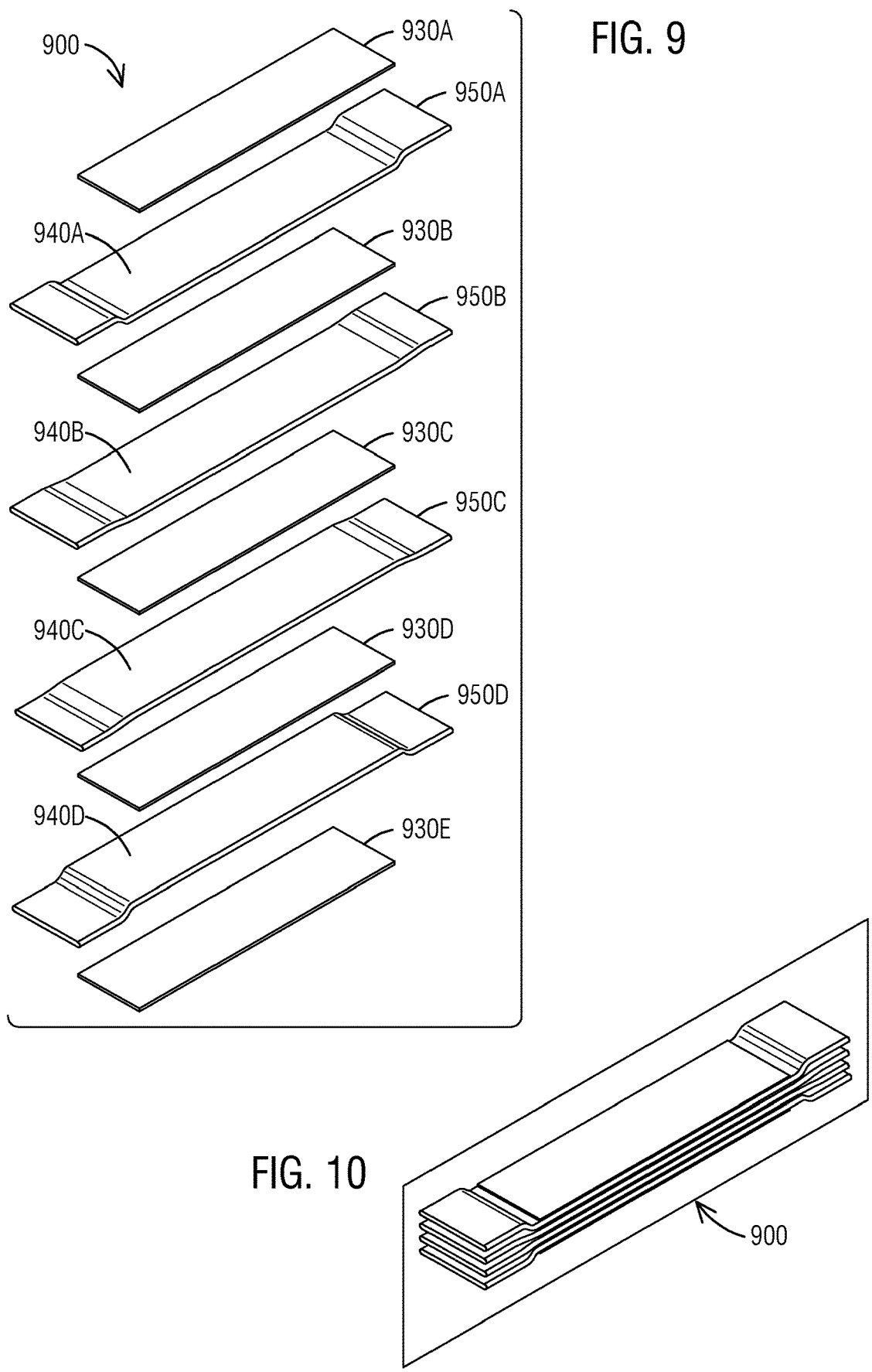
FIG. 9 illustrates an exploded view of a conductor set in accordance with an exemplary embodiment of the present invention.
FIG. 10 illustrates an assembled view of a conductor set in accordance with an exemplary embodiment of the present invention.

With respect to FIG. 9, it illustrates an exploded view of a conductor set 900 in accordance with an exemplary embodiment of the present invention. The conductor set 900 includes a plurality of viscoelastic structural sheets 930A-930E stacked alternatively between a plurality of conductor bars 950A-950D. Each conductor bar 950A-950D may be wrapped with rigid insulation coating 940A-940D. For example, an insulated electrical conductor comprising a first viscoelastic structural sheet 930A being adhered to an insulation 940A of a first conductor bar 950A where walls 952A and 952B of the first conductor bar 950A are disposed toward the first viscoelastic structural sheet 930A and where the insulation 940A of the opposed side of the first conductor bar 950A being adhered with a second viscoelastic structural sheet 930B.

Rigid insulation coating 940A-940D is a thermoset polymer insulation having characteristics as follows; relative thermal index 130 degrees Celsius (mechanical, with or without impact) per UL 746B, thermal shock resistance of 12+ cycles at −20 to 400 degrees Fahrenheit, minimum tensile strength of 7500 lbs., Shore D hardness 94, dielectric strength of 800V/mil. The polymer material, provided in powder form, is applied to surfaces of bars 950A-950D where insulation being thermally cured yields a permanently adhered rigid insulation coating ~0.030 inches thick having essential surface energy characteristics that promote development of high molecular force of attraction with the adhesive of structural sheets 930A-930E.

The viscoelastic structural sheets 930A-930E are a viscoelastic polymer sheet having a thickness of 0.045 inches, width of 3.75 inches, length proportional with a systems conductor bar and having a certain adhesive laminated on two sides disposed perpendicular to the sheets thickness. The sheets internal structure comprises a matrix of adjoined voids having impermeable elastic walls where each voids internal volume remains independent of the atmosphere and of any other adjoined void creating an essentially sealed structure where ingress of substances is prevented and where each voids walls, internal volume and pressure can vary dynamically as external force is applied giving the sheet a determined ability to temporarily displace elastically without damage when subjected to high instantaneous forces consistent with an electrical short circuit event. The sheets certain structural properties include tensile strength of 95 psi and shear strength of 105 psi are determined to produce strength characteristics suitable to maintain mechanical and electrical integrity of the system 105 when loaded. The sheets adhesive is determined to form a molecular attraction force equivalent to 211$b$ per inch ASTM 3330 Peel Strength without separation form the sheets internal matrix structure furthering the sheets viability as a structural component of the system 105. The sheets sealed structure is determined to prevent absorption of electrolytic contaminants thus maintaining the stable dielectric insulation properties essential to insulators having intimate contact with energized electrical conductors.

FIG. 10 illustrates an assembled view of the conductor set 900 in accordance with an exemplary embodiment of the present invention. Opposed ends of the conductor set 900 are disposed in the system 105 such as to accept an electrical connector.

Figure 11B:
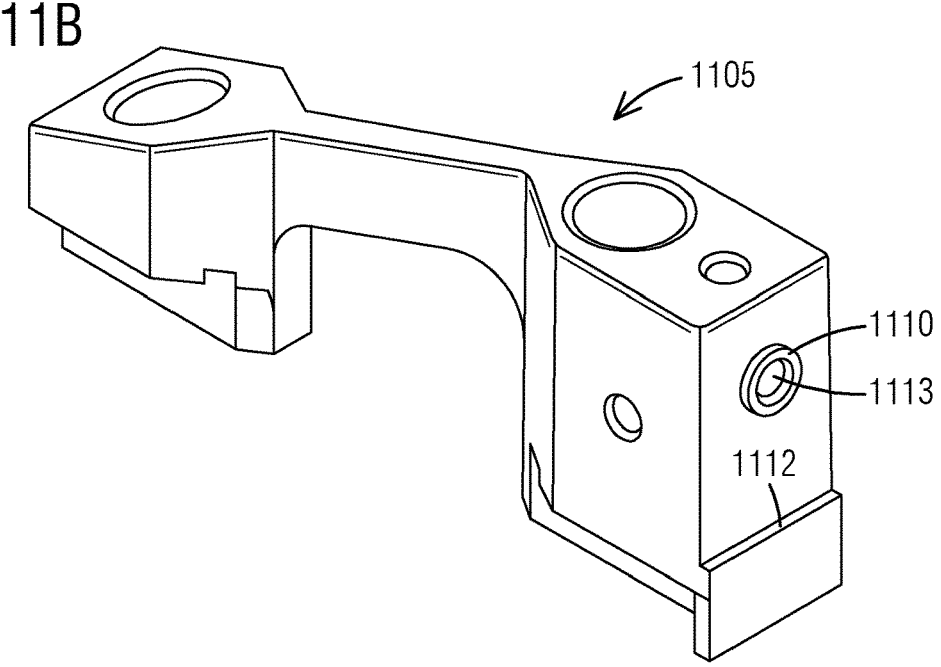
FIG. 11B illustrates an isometric view (top) of an end clamp in accordance with an exemplary embodiment of the present invention.
Figure 11A:
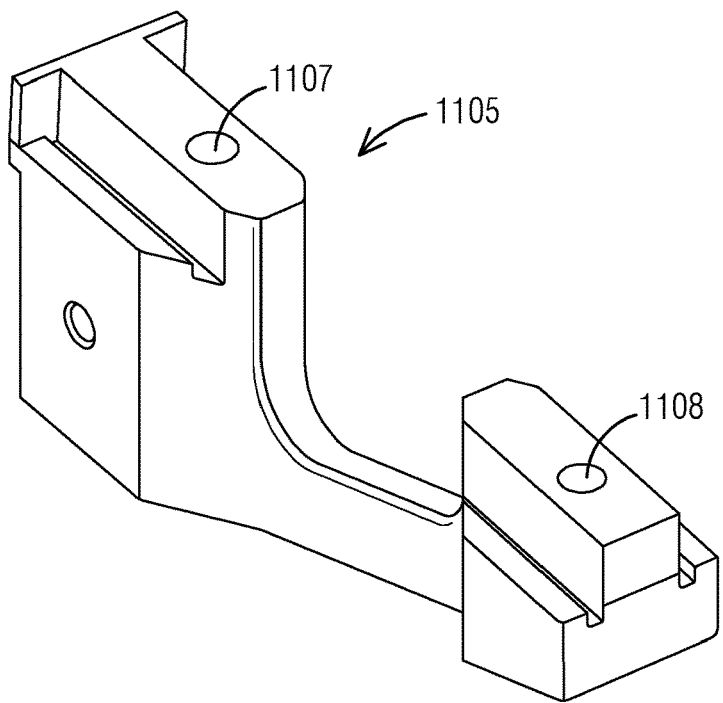
FIG. 11A illustrates an isometric view (bottom) of an end clamp in accordance with an exemplary embodiment of the present invention.

FIG. 11A illustrates an isometric view (bottom) of an end clamp 1105 in accordance with an exemplary embodiment of the present invention. The end clamp 1105 is a metal component having certain electrical and structural properties and having a plurality of features determined to locate, fasten, or align with a second end clamp, the conductor section 110 and additional components of end assemblies of FIGS. 14, 20-22. The end clamp 1105 comprises a hole 1107 and a hole 1108.

FIG. 11B illustrates an isometric view (top) of the end clamp 1105 in accordance with an exemplary embodiment of the present invention. The end clamp 1105 comprises a wall 1112, a hole 1113 and a wall 1110.

Figure 12:
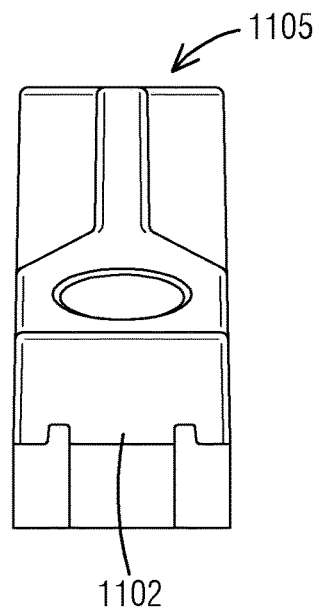
FIG. 12 illustrates an end view detail of an end clamp in accordance with an exemplary embodiment of the present invention.

FIG. 12 illustrates an end view detail of the end clamp 1105 in accordance with an exemplary embodiment of the present invention. The end clamp 1105 comprises a wall 1102.

Figure 13:
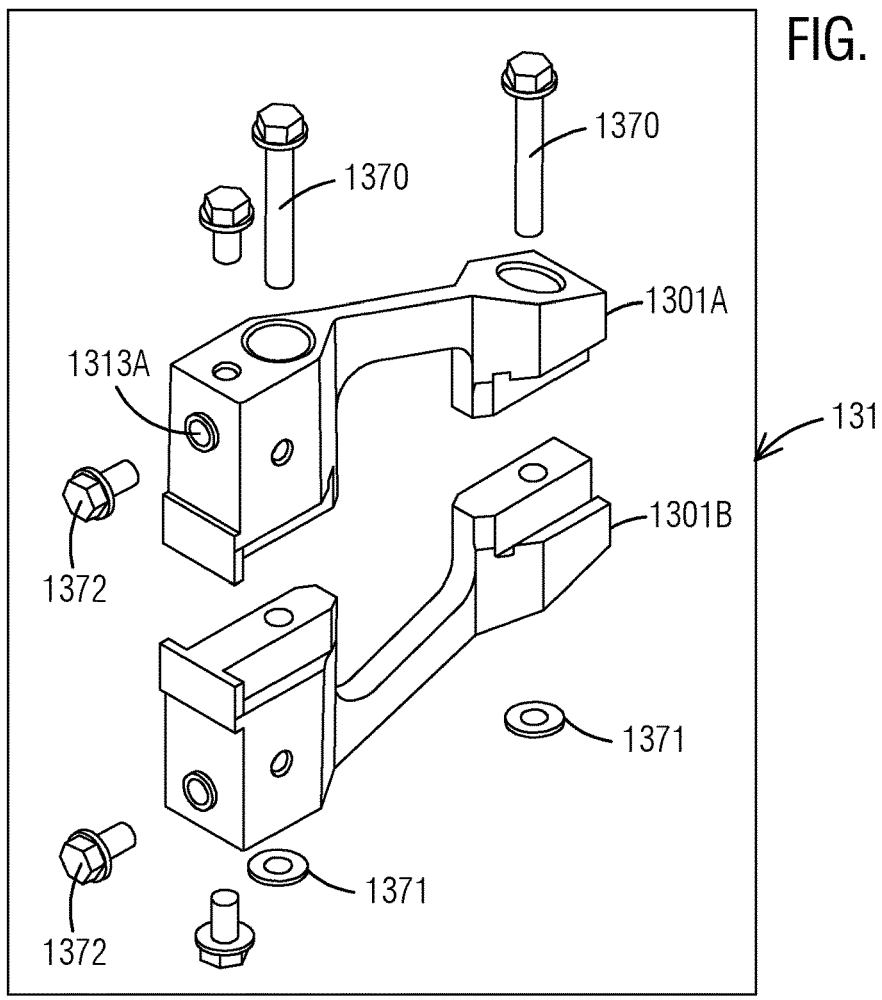
FIG. 13 illustrates an exploded view of a clamp set in accordance with an exemplary embodiment of the present invention.

FIG. 13 illustrates an exploded view of a clamp set 1310 in accordance with an exemplary embodiment of the present invention. Referring to FIGS. 11A, 111B, 12 and 13, the clamp set 1310 comprises a first "upper" end clamp 1301A and a second "lower" end clamp 1301B where the wall 1102 of its upper end clamp 1301A is opposed to the wall 1102 of its lower end clamp 1301B and where each are determined to be in intimate contact and where the hole 1107 of its upper end clamp 1301A is aligned with the hole 1108 of its lower end clamp 1301B and where the hole 1108 of its upper end clamp 1301A is aligned with the hole 1107 of its lower end clamp 1301B. A bolt 1370 is inserted into hole sets 1107 and 1108 of upper and lower end clamps 1301A, 1301B and extending through where a respective nut 1371 is threaded onto each bolt 1370. Tightening the bolt 1370 with the nut 1371 provides a determined clamping force between the walls 1102.

Figure 14:
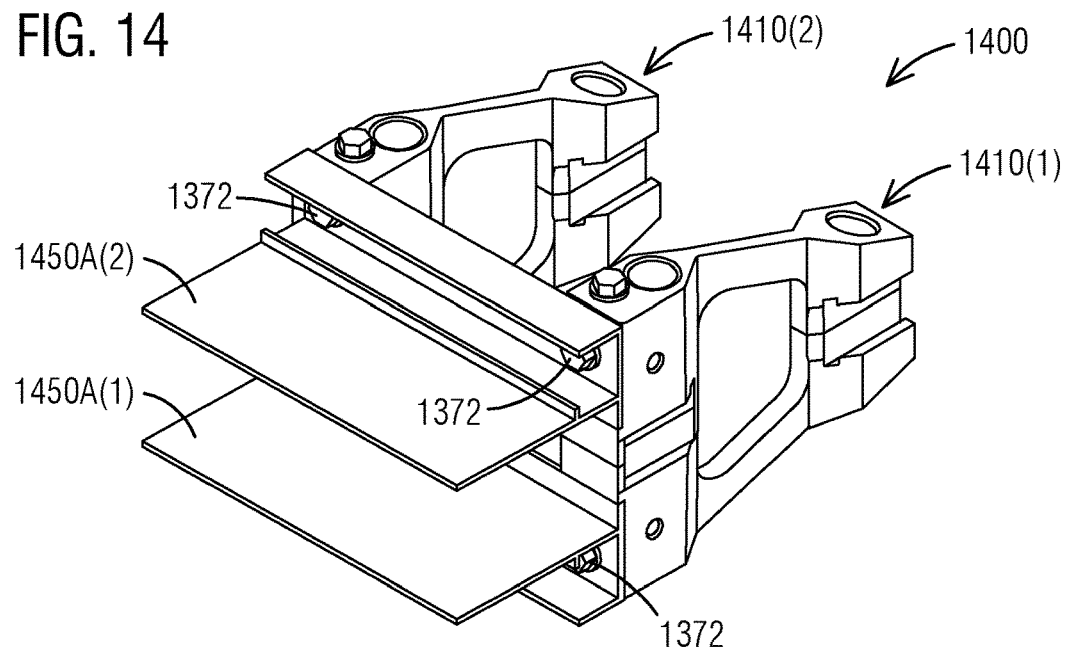
FIG. 14 illustrates an isometric view of a first end assembly in accordance with an exemplary embodiment of the present invention.

FIG. 14 illustrates an isometric view of a first end assembly 1400 in accordance with an exemplary embodiment of the present invention. An end assembly is determined as a means for mechanically connecting any number of conductor sections at their ends and electively at their edges to form constructions having certain incremental electrical, mechanical properties in accordance with a systems specification.

The first end assembly 1400 comprises a first clamp set 1410(1) where the inner diameter of a through hole 1956 (FIG. 19) of a first ground plate 1450A(1) (FIGS. 14, 15) is aligned with the outer diameter of the wall 1410 (FIG. 11B) of the upper end clamp 1301A (FIG. 13) and where a wall 1954 (FIG. 19) of the first ground plate 1450A(1) is opposed and in intimate contact with the wall 1112 (FIG. 11B) of the upper end clamp 1301A and where a bolt 1372 (FIG. 13, 14) is threaded into a hole 1313A (FIG. 13) of the upper end clamp 1301A securing the first ground plate 1450A(1). A second ground plate 1450A(2) is being positioned and secured as described. A second clamp set 1410(2) is provided at a successive set of holes of ground plates being positioned and secured as described.

Figure 15:
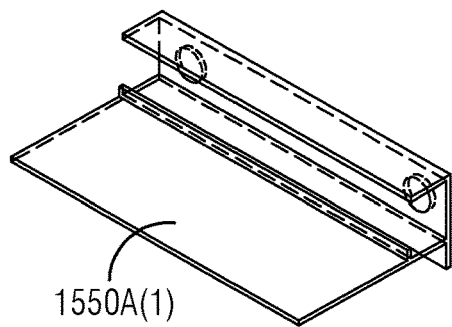
FIG. 15 illustrates a first ground plate in accordance with an exemplary embodiment of the present invention.

FIG. 15 illustrates a first ground plate 1550A(1) in accordance with an exemplary embodiment of the present invention. The first ground plate 1550A(1) is a formed metal component having a determined cross-sectional area and providing certain electrical and mechanical properties suitable with a systems specification. Ground Plates are having a determined length as suitable for a systems specification and where each has two, three, four, or five successive thru holes spaced incrementally along its length.

Figure 16:
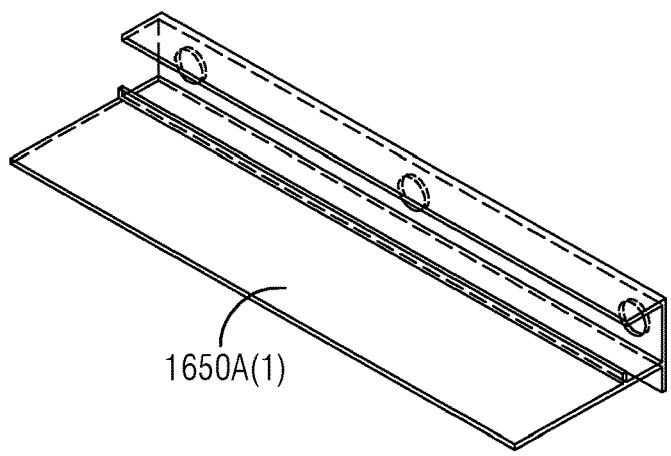
FIG. 16 illustrates a second ground plate in accordance with an exemplary embodiment of the present invention.
Figure 17:
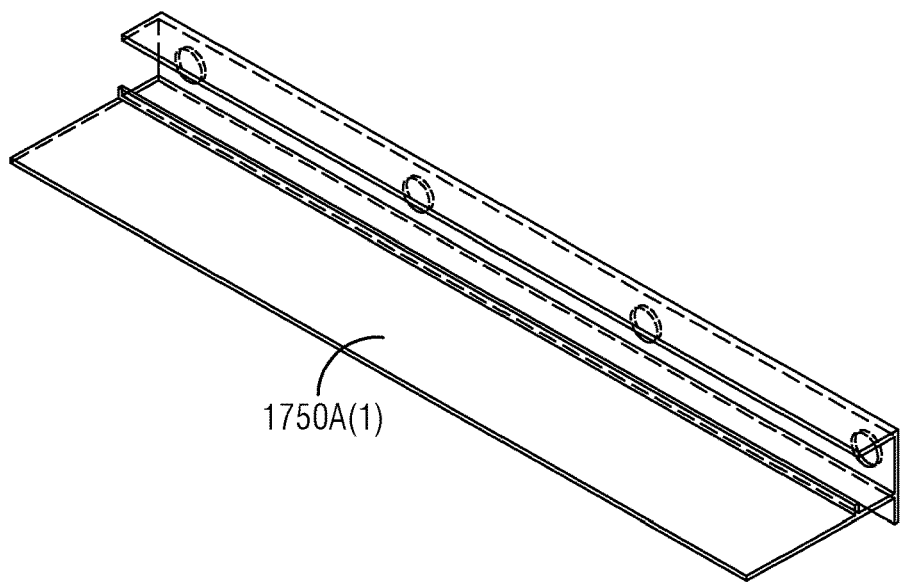
FIG. 17 illustrates a third ground plate in accordance with an exemplary embodiment of the present invention.
Figure 18:
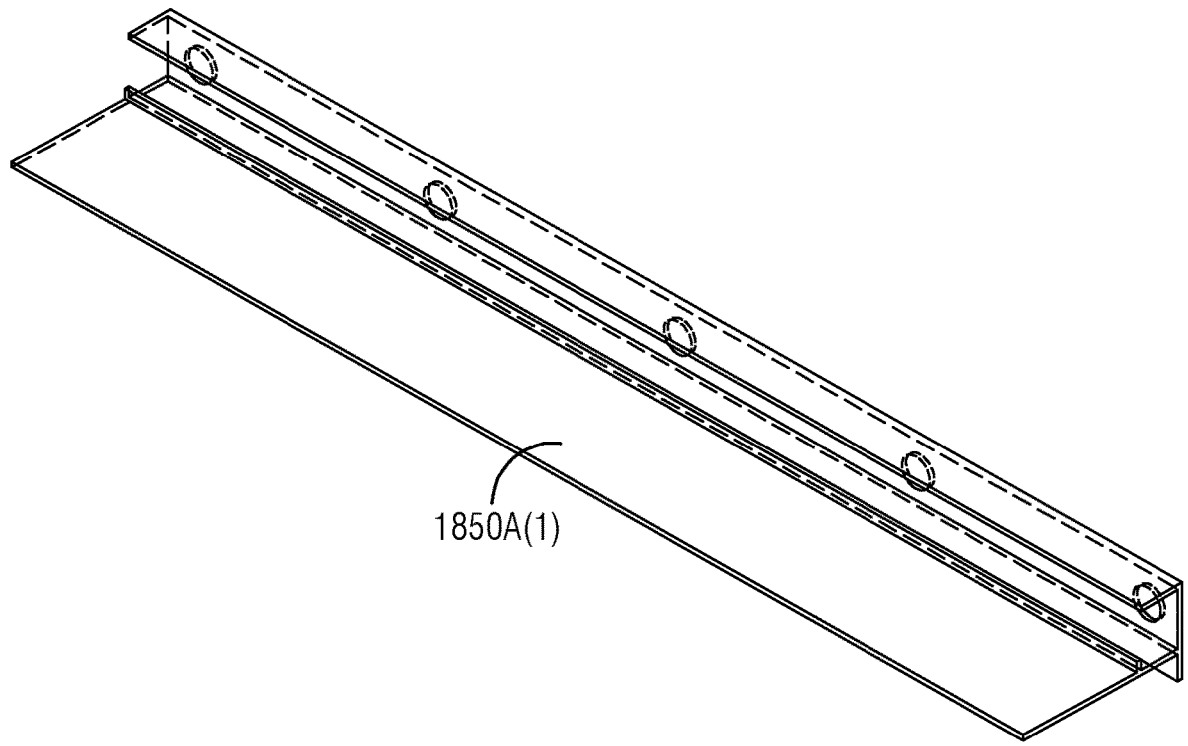
FIG. 18 illustrates a fourth ground plate in accordance with an exemplary embodiment of the present invention.

FIG. 16 illustrates a second ground plate 1650A(1) in accordance with an exemplary embodiment of the present invention. FIG. 17 illustrates a third ground plate 1750A(1) in accordance with an exemplary embodiment of the present invention. FIG. 18 illustrates a fourth ground plate 1850A(1) in accordance with an exemplary embodiment of the present invention.

Figure 19:
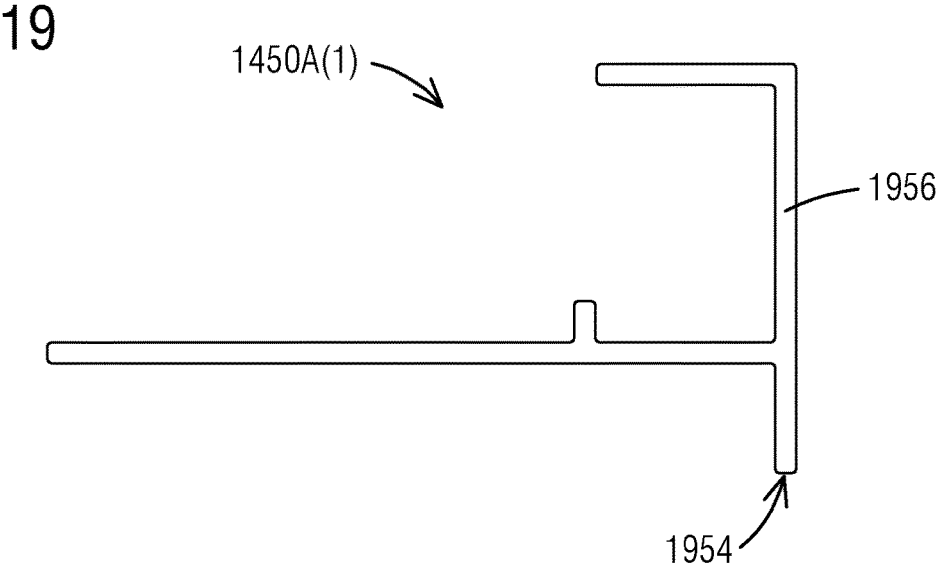
FIG. 19 illustrates an end view detail of a ground plate in accordance with an exemplary embodiment of the present invention.

FIG. 19 illustrates an end view detail of the first ground plate 1450A(1) in accordance with an exemplary embodiment of the present invention. The first ground plate 1450A (1) comprises the through hole 1956 and the wall 1954.

Figure 20:
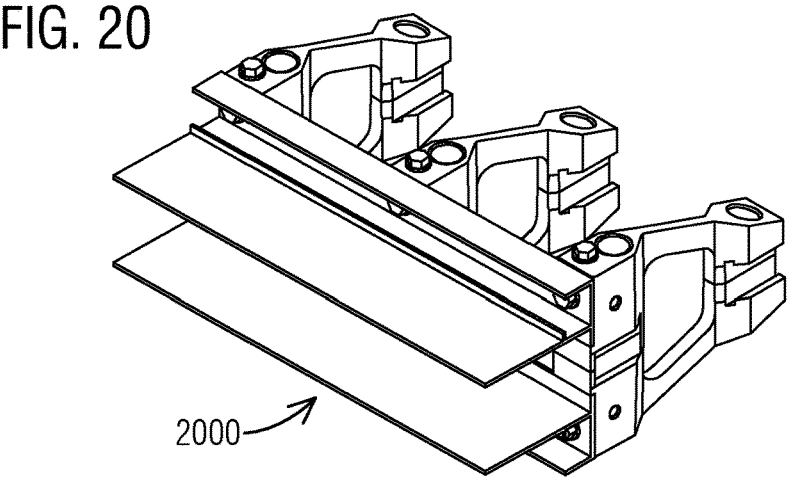
FIG. 20 illustrates a second end assembly in accordance with an exemplary embodiment of the present invention.
Figure 21:
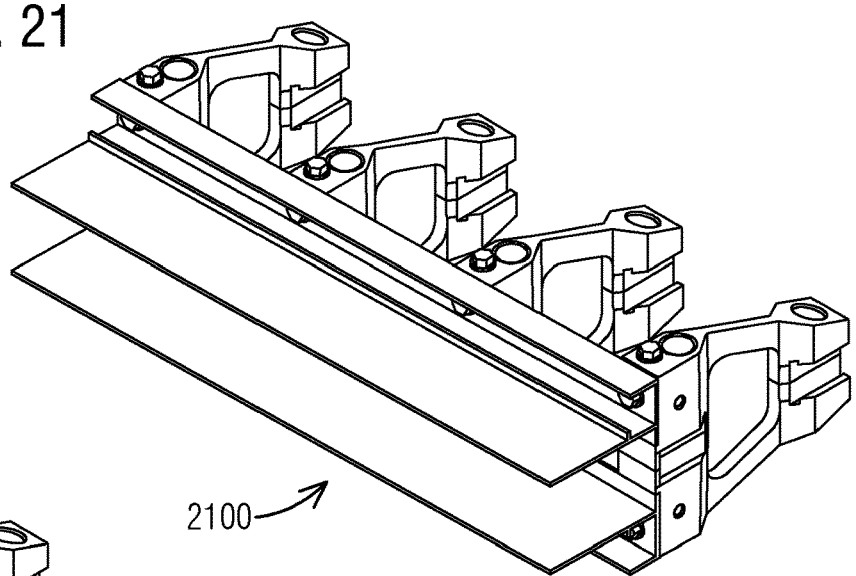
FIG. 21 illustrates a third end assembly in accordance with an exemplary embodiment of the present invention.
Figure 22:
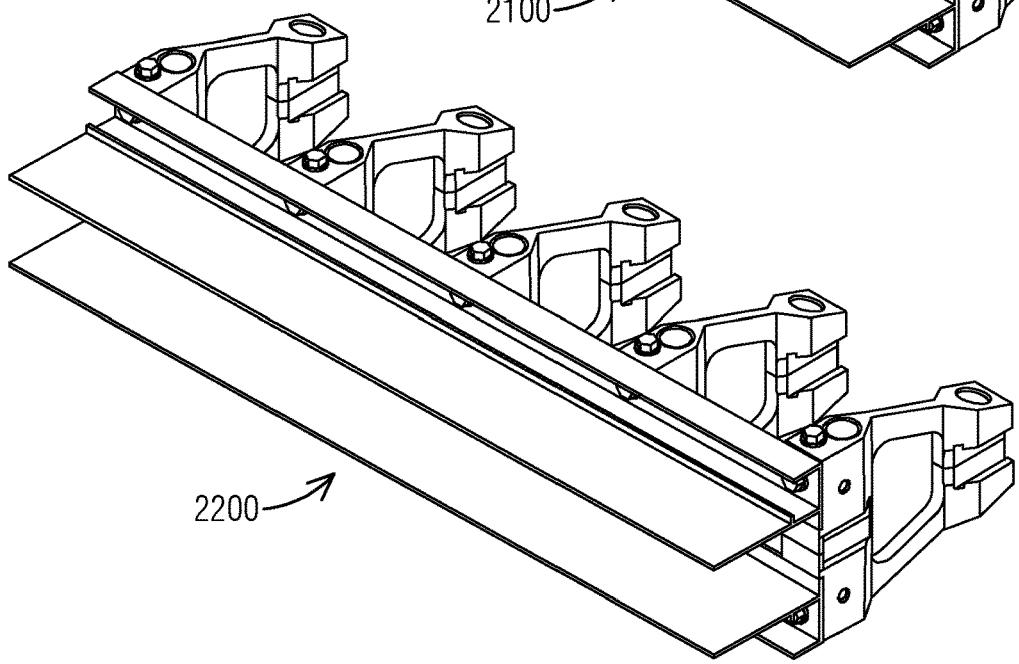
FIG. 22 illustrates a fourth end assembly in accordance with an exemplary embodiment of the present invention.

FIG. 20 illustrates a second end assembly 2000 in accordance with an exemplary embodiment of the present invention. FIG. 21 illustrates a third end assembly 2100 in accordance with an exemplary embodiment of the present invention. FIG. 22 illustrates a fourth end assembly 2200 in accordance with an exemplary embodiment of the present invention.

Figure 23:
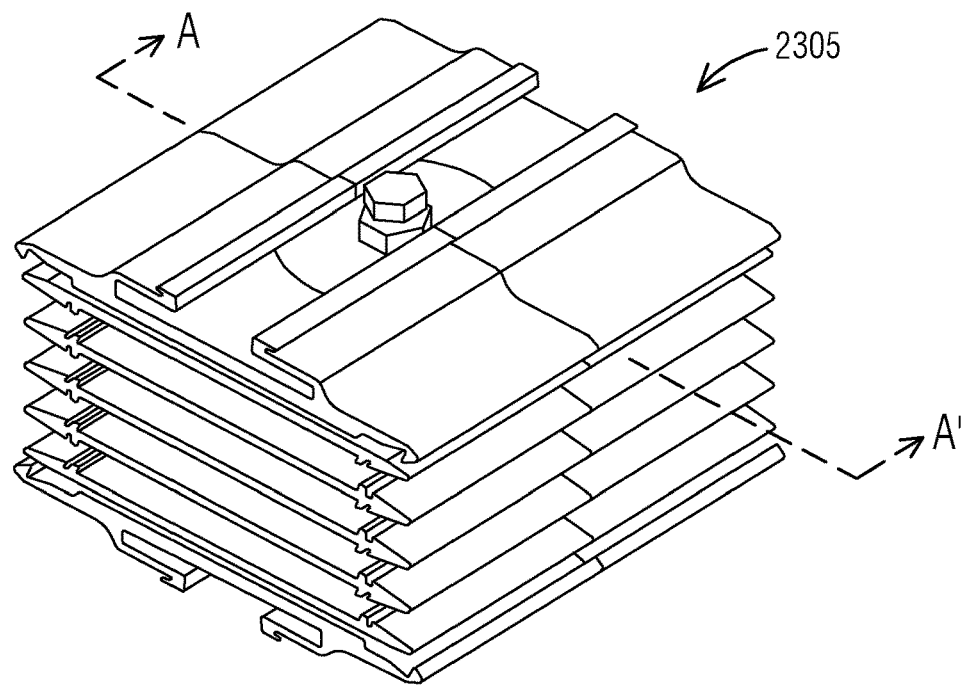
FIG. 23 illustrates an isometric view of a connector in accordance with an exemplary embodiment of the present invention.

FIG. 23 illustrates an isometric view of an electrical connector 2305 in accordance with an exemplary embodiment of the present invention. The electrical connector 2305 comprises a plurality of conductive plates being separated by electrical insulators and having upper and lower structural plates where the plurality having means to receive a conductor section at either of its sides. It receives any number of electrically isolated bolts having nuts being extended perpendicularly through the plurality of conductive plates and insulators and having a determined clamping force when tightened.

Figure 24:
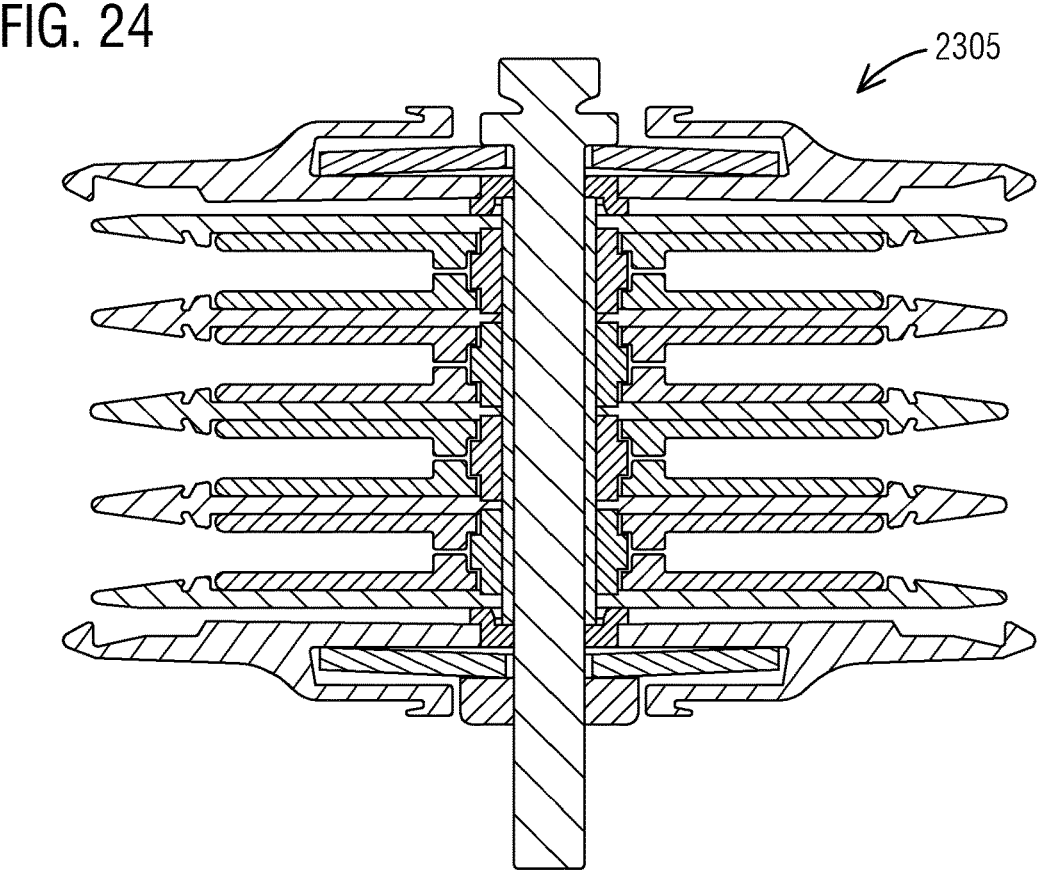
FIG. 24 illustrates a cross sectional view of a connector in accordance with an exemplary embodiment of the present invention.

FIG. 24 illustrates a cross sectional view of the electrical connector 2305 in accordance with an exemplary embodiment of the present invention. The cross sectional view is shown at an axis A-A in FIG. 23.

Figure 25:
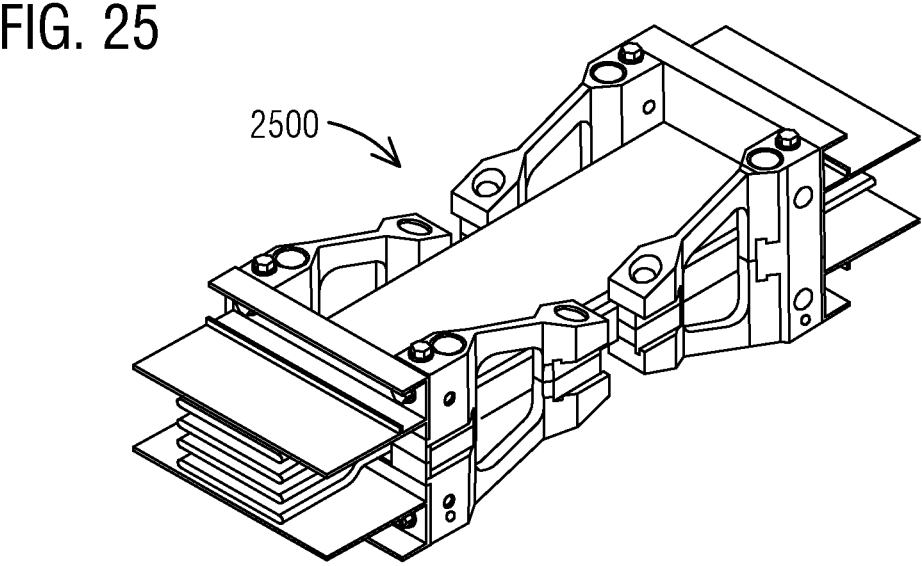
FIG. 25 illustrates an isometric view of a first busway section in accordance with an exemplary embodiment of the present invention.
Figure 26:
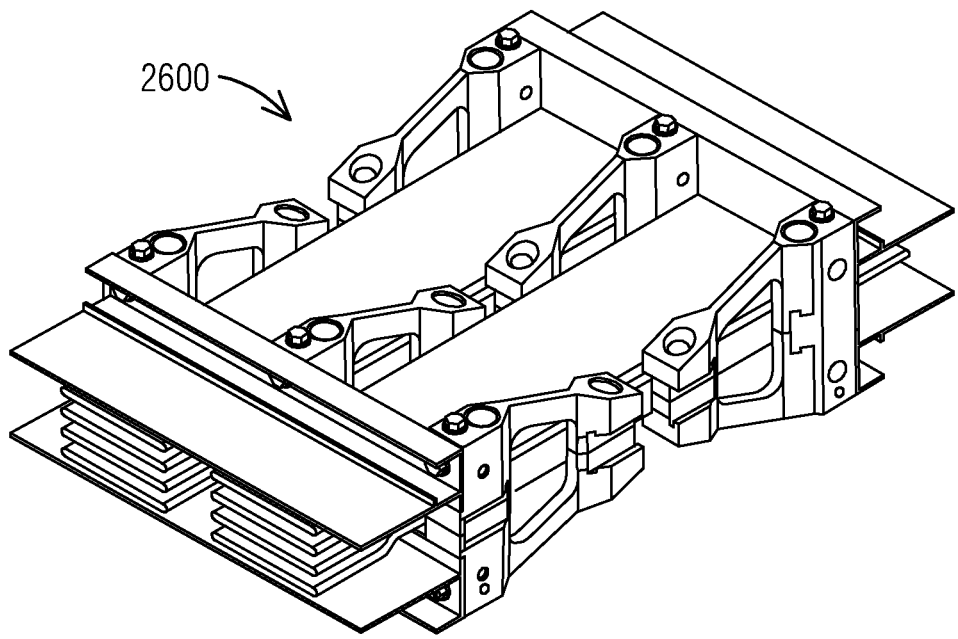
FIG. 26 illustrates an isometric view of a second busway section in accordance with an exemplary embodiment of the present invention.
Figure 27:
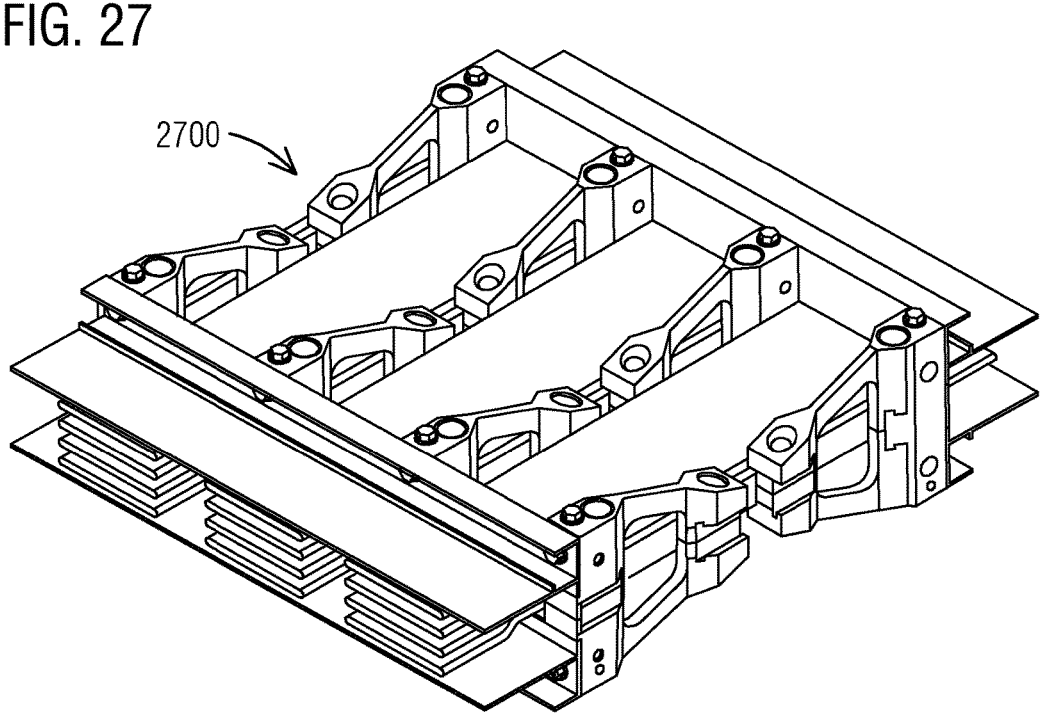
FIG. 27 illustrates an isometric view of a third busway section in accordance with an exemplary embodiment of the present invention.
Figure 28:
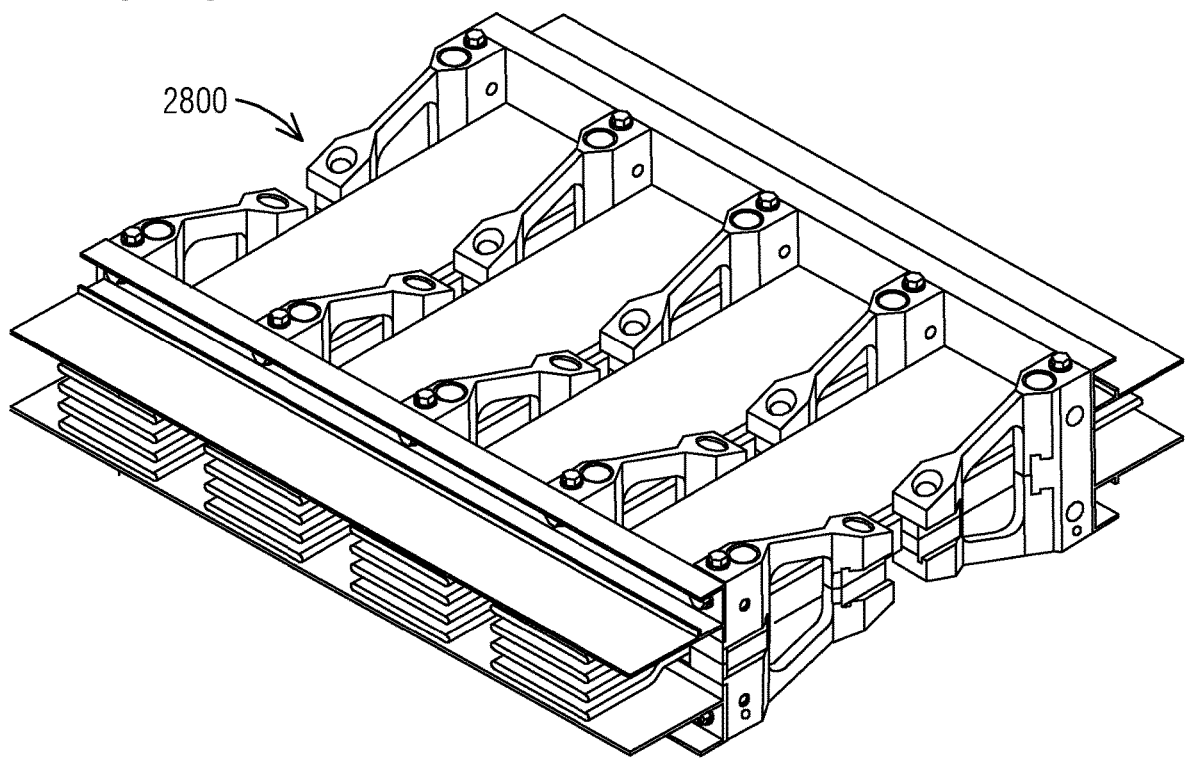
FIG. 28 illustrates an isometric view of a fourth busway section in accordance with an exemplary embodiment of the present invention.

FIG. 25 illustrates an isometric view of a first busway section 2500 in accordance with an exemplary embodiment of the present invention. FIG. 26 illustrates an isometric view of a second busway section 2600 in accordance with an exemplary embodiment of the present invention. FIG. 27 illustrates an isometric view of a third busway section 2700 in accordance with an exemplary embodiment of the present invention. FIG. 28 illustrates an isometric view of a fourth busway section 2800 in accordance with an exemplary embodiment of the present invention.

Figure 29:
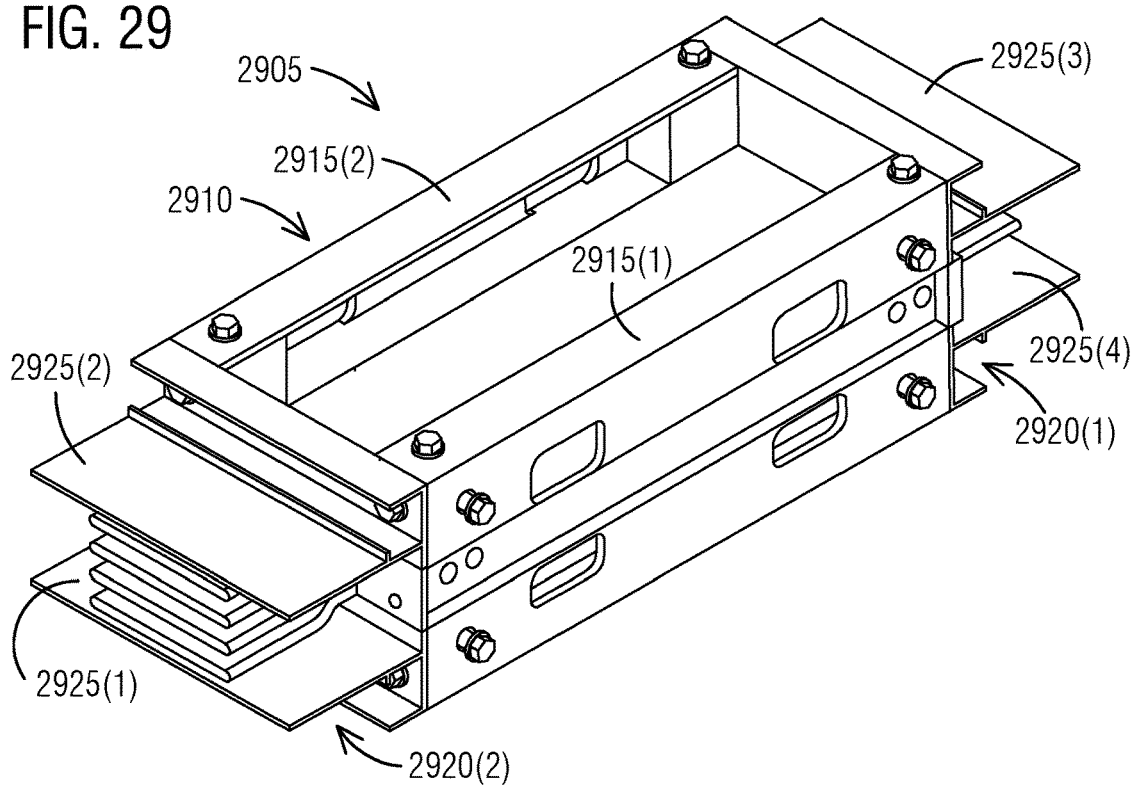
FIG. 29 illustrates an isometric view of a first busway section including a conductor section with side rails, end blocks and ground plates in accordance with an exemplary embodiment of the present invention.

FIG. 29 illustrates an isometric view of a busway section 2905 including a conductor section 2910 with side rails 2915(1-2), end blocks 2920(1-2) and ground plates 2925(1-4) in accordance with an exemplary embodiment of the present invention.

Figure 30A:
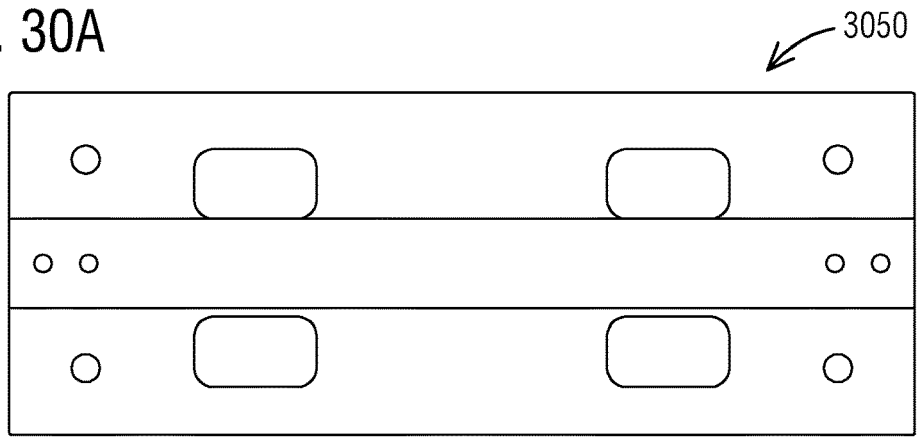
FIG. 30A illustrates a side view of a side rail in accordance with an exemplary embodiment of the present invention.

FIG. 30A illustrates a side view of a side rail 3050 in accordance with an exemplary embodiment of the present invention. The side rail 3050 has metal having an electrical continuity suitable with a systems rating. The side rail 3050 is formed having a plurality of features determined to slidably interlock with the housing assembly 210 of the conductor section 110 such that an end block 2920 may be fixedly joined at either end. The side rail 3050 has any one or more of a protective coating of paint, electroplates of zinc, nickel and alloys of metal, or an anodized oxide of any color.

Figure 30B:
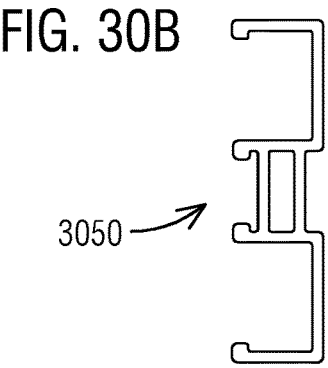
FIG. 30B illustrates an end view detail of the side rail in accordance with an exemplary embodiment of the present invention.

FIG. 30B illustrates an end view detail of the side rail 3050 in accordance with an exemplary embodiment of the present invention. The side rail 3050 is configured to mount on the housing assembly 210 of the conductor section 110.

Figure 31:
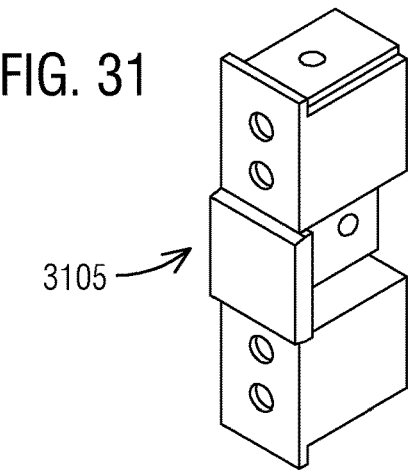
FIG. 31 illustrates an isometric view of an end block in accordance with an exemplary embodiment of the present invention.

FIG. 31 illustrates an isometric view of an end block 3105 in accordance with an exemplary embodiment of the present invention. The end block 3105 is a metal component having certain electrical and structural properties and having a plurality of features determined to locate, fasten, or align with the housing assembly 210 of the conductor section 110.

Figure 32:
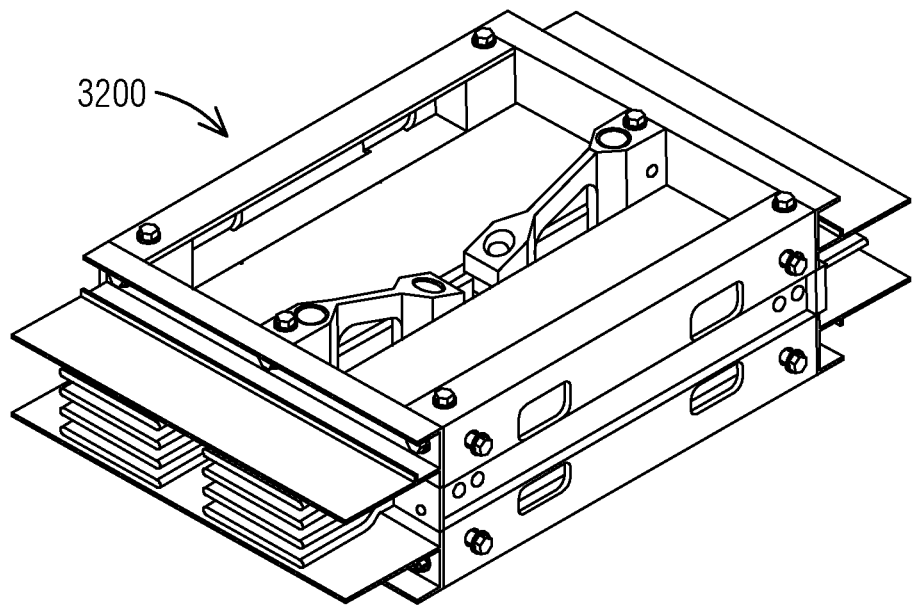
FIG. 32 illustrates an isometric view of a second busway section in accordance with an exemplary embodiment of the present invention.
Figure 33:
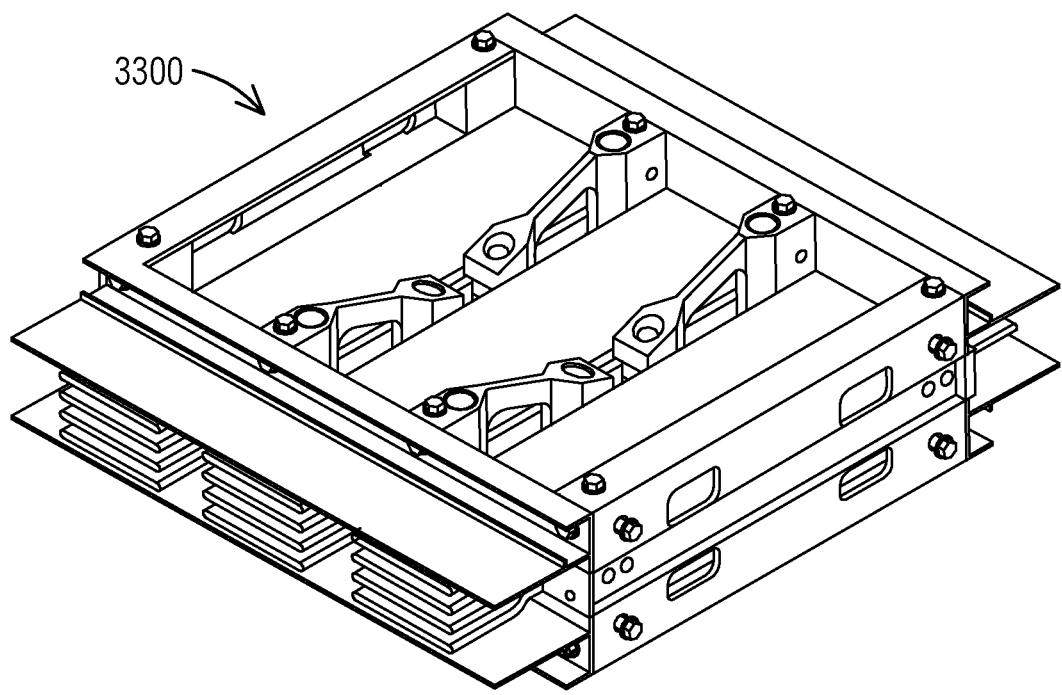
FIG. 33 illustrates an isometric view of a third busway section in accordance with an exemplary embodiment of the present invention.
Figure 34:
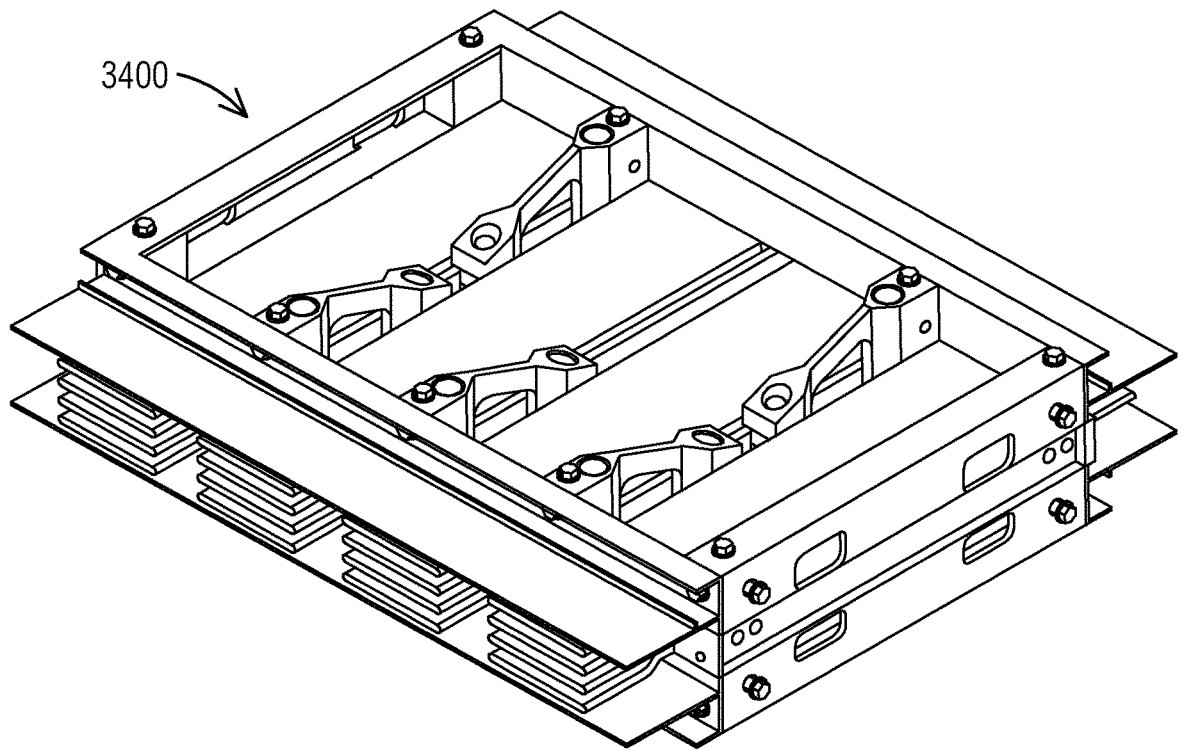
FIG. 34 illustrates an isometric view of a fourth busway section in accordance with an exemplary embodiment of the present invention.

FIG. 32 illustrates an isometric view of a second busway section 3200 in accordance with an exemplary embodiment of the present invention. FIG. 33 illustrates an isometric view of a third busway section 3300 in accordance with an exemplary embodiment of the present invention. FIG. 34 illustrates an isometric view of a fourth busway section 3400 in accordance with an exemplary embodiment of the present invention.

The conductor section 110 has an environmental seal (not seen) for the housing assembly 210, a fixed external geometry of the housing assembly 210 and sides to receive additional structures. The conductor section 110 includes an end clamp comprising first features (not seen) which interlock with sides of the conductor section, second features (not seen) which clamp onto the housing assembly 210 of the conductor section and third features (not seen) which engage to form an electrical connection. The conductor section 110 further comprises the side rail 3050 on one side or both sides of the conductor section, a first end block fixedly joined at either end of the side rail and a second end block where a first and a second ground plate form an electrical path. The system 105 further comprises an end assembly wherein the one or more conductor sections are joined at their sides such that an electrical capacity of the busway system 105 is increased by adjoining two or more conductor sections while adjoined conductor sections remain thermally isolated from each other. The one or more conductor sections are retained having an air space around their enclosure.

Figure 35:
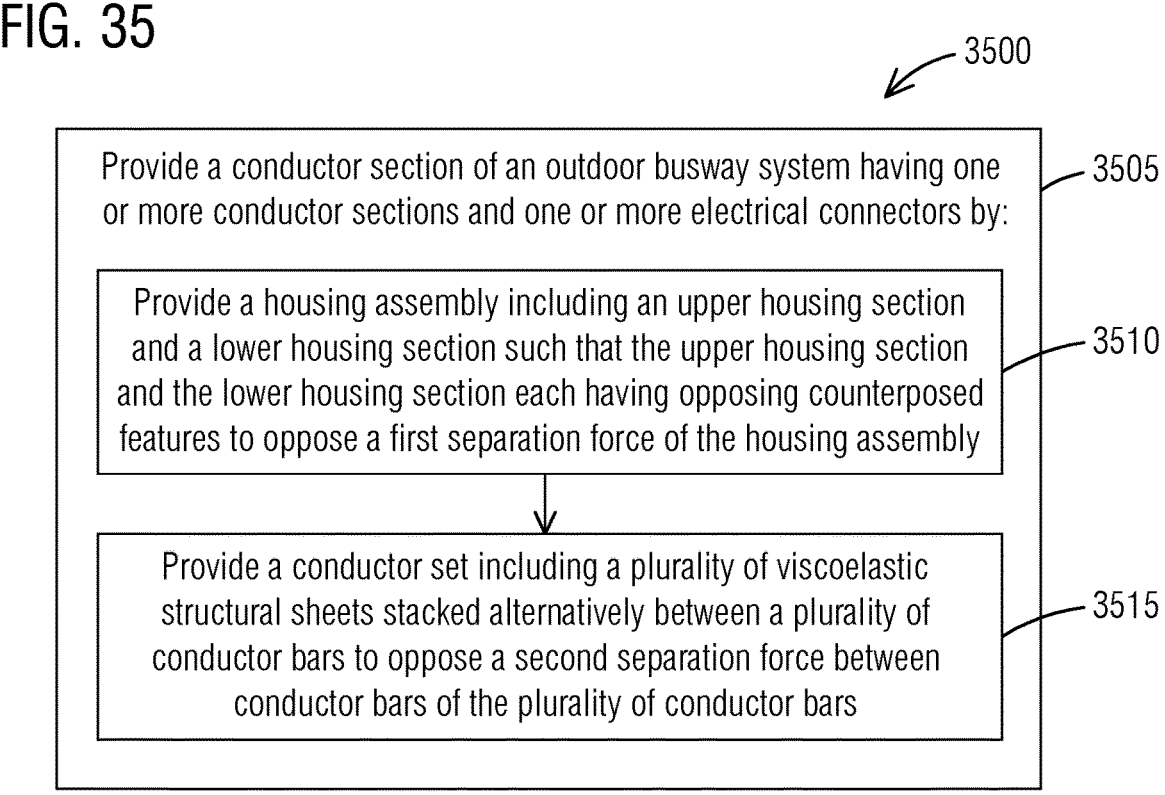
FIG. 35 illustrates a schematic view of a flow chart of a method of providing an outdoor busway system having one or more conductor sections and one or more electrical connectors in accordance with an exemplary embodiment of the present invention.

FIG. 35 illustrates a schematic view of a flow chart of a method 3500 of protecting the outdoor busway system 105 having one or more conductor sections and one or more electrical connectors in accordance with an exemplary embodiment of the present invention. Reference is made to the elements and features described in FIGS. 1-34. It should be appreciated that some steps are not required to be performed in any particular order, and that some steps are optional.

The method 3500 comprises a step 3505 of providing a conductor section of an outdoor busway system having one or more conductor sections and one or more electrical connectors. The step 3505 of the method 3500 further comprises a step 3510 of providing a housing assembly including an upper housing section and a lower housing section such that the upper housing section and the lower housing section each having opposing counterposed features to oppose a first separation force of the housing assembly. The step 3505 of the method 3500 further comprises a step 3515 of providing a conductor set including a plurality of viscoelastic structural sheets stacked alternatively between a plurality of conductor bars to oppose a second separation force between conductor bars of the plurality of conductor bars.

While a "sandwich" construction where insulated conductors of opposite polarity are stacked successively and restrained in contact with one another in the form of a bar pack is described here a range of one or more other busways are also contemplated by the present invention. For example, other busways may be implemented based on one or more features presented above without deviating from the spirit of the present invention.

The techniques described herein can be particularly useful for a conductor section having two housing halves with each half having opposing counterposed features. While particular embodiments are described in terms of the two housing halves, the techniques described herein are not limited to such arrangement but can also be used with other arrangements.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An outdoor busway system having one or more conductor sections and one or more electrical connectors such that a conductor section of the outdoor busway system comprising:
    a housing assembly including an upper housing section and a lower housing section such that the upper housing section and the lower housing section each having opposing counterposed features to oppose a first separation force of the housing assembly; and
    a conductor set including a plurality of viscoelastic structural sheets stacked alternatively between a plurality of conductor bars to oppose a second separation force between conductor bars of the plurality of conductor bars, wherein the plurality of viscoelastic structural sheets is configured to prevent liquid ingress between conductor bars of the plurality of conductor bars, absorb an instantaneous force's loads, and electrically insulate between conductor bars of the plurality of conductor bars.

2. The system of claim 1, wherein the opposing counterposed features are configured to prevent separation of the upper housing section from the lower housing section.

3. The system of claim 2, wherein the opposing counterposed features are assembled together so as to open in a destructive manner.

4. The system of claim 1, wherein a viscoelastic structural sheet of the plurality of viscoelastic structural sheets is a structural adhesive sheet being a viscoelastic polymer sheet having a thickness of 0.045 inches, a width of 3.75 inches, a length proportional with a conductor bar of the plurality of conductor bars and having an adhesive laminated on two sides and disposed perpendicular to the thickness.

5. The system of claim 1, wherein the housing assembly having an ability to interlock the upper housing section with the lower housing section thus forming an enclosed surround.

6. The system of claim 1, wherein the housing assembly is void of thru holes and void of threaded fasteners.

7. The system of claim 1, wherein each conductor bar's of the plurality of conductor bars largest flat area is joined contiguously.

8. The system of claim 1, wherein the plurality of conductor bars is configured to move elastically without separation.

9. The system of claim 1, wherein the conductor set having ends to receive an electrical connector of the one or more electrical connectors.

10. An outdoor busway system having one or more conductor sections and one or more electrical connectors such that a conductor section of the outdoor busway system comprising:
    a housing assembly including an upper housing section and a lower housing section such that the upper housing section and the lower housing section each having opposing counterposed features to oppose a first separation force of the housing assembly; and
    a conductor set including a plurality of viscoelastic structural sheets stacked alternatively between a plurality of conductor bars to oppose a second separation force between conductor bars of the plurality of conductor bars, wherein the conductor section further having:
    a. an environmental seal for the housing assembly;
    b. a fixed external geometry of the housing assembly; and
    c. sides to receive additional structures.

11. An outdoor busway system having one or more conductor sections and one or more electrical connectors such that a conductor section of the outdoor busway system comprising:
    a housing assembly including an upper housing section and a lower housing section such that the upper housing section and the lower housing section each having opposing counterposed features to oppose a first separation force of the housing assembly; and
    a conductor set including a plurality of viscoelastic structural sheets stacked alternatively between a plurality of conductor bars to oppose a second separation force between conductor bars of the plurality of conductor bars, wherein the conductor section further having an end clamp comprising:
    a. first features which interlock with sides of the conductor section;
    b. second features which clamp onto the housing assembly of the conductor section; and
    c. third features which engage to form an electrical connection.

12. An outdoor busway system having one or more conductor sections and one or more electrical connectors such that a conductor section of the outdoor busway system comprising:
    a housing assembly including an upper housing section and a lower housing section such that the upper housing section and the lower housing section each having opposing counterposed features to oppose a first separation force of the housing assembly; and
    a conductor set including a plurality of viscoelastic structural sheets stacked alternatively between a plurality of conductor bars to oppose a second separation force between conductor bars of the plurality of conductor bars, wherein the conductor section further comprising:
    a. a side rail on one side or both sides of the conductor section;
    b. a first end block fixedly joined at either end of the side rail;
    c. a second end block where a first and a second ground plate form an electrical path.

13. An outdoor busway system having one or more conductor sections and one or more electrical connectors such that a conductor section of the outdoor busway system comprising:
    a housing assembly including an upper housing section and a lower housing section such that the upper housing section and the lower housing section each having opposing counterposed features to oppose a first separation force of the housing assembly;
    a conductor set including a plurality of viscoelastic structural sheets stacked alternatively between a plurality of conductor bars to oppose a second separation force between conductor bars of the plurality of conductor bars; and further comprising:

an end assembly wherein the one or more conductor sections are joined at their sides such that an electrical capacity of the busway system is increased by adjoining two or more conductor sections while adjoined conductor sections remain thermally isolated from each other.

14. The system of claim 13, wherein the one or more conductor sections are retained having an air space around their enclosure.

15. A method of protecting an outdoor busway system having one or more conductor sections and one or more electrical connectors, the method comprising:

providing a conductor section of the busway system by:

providing a housing assembly including an upper housing section and a lower housing section such that the upper housing section and the lower housing section each having opposing counterposed features to oppose a first separation force of the housing assembly; and providing a conductor set including a plurality of viscoelastic structural sheets stacked alternatively between a plurality of conductor bars to oppose a second separation force between conductor bars of the plurality of conductor bars.

16. The method of claim 15, wherein the opposing counterposed features are configured to prevent separation of the upper housing section from the lower housing section.

17. The method of claim 16, wherein the opposing counterposed features are assembled together so as to open in a destructive manner.

18. The method of claim 15, wherein a viscoelastic structural sheet of the plurality of viscoelastic structural sheets is a structural adhesive sheet being a viscoelastic polymer sheet having a thickness of 0.045 inches, a width of 3.75 inches, a length proportional with a conductor bar of the plurality of conductor bars and having an adhesive laminated on two sides and disposed perpendicular to the thickness.

19. The method of claim 15, wherein the housing assembly having an ability to interlock the upper housing section with the lower housing section thus forming an enclosed surround and the housing assembly is void of thru holes and void of threaded fasteners.

* * * * *